Figure 1:
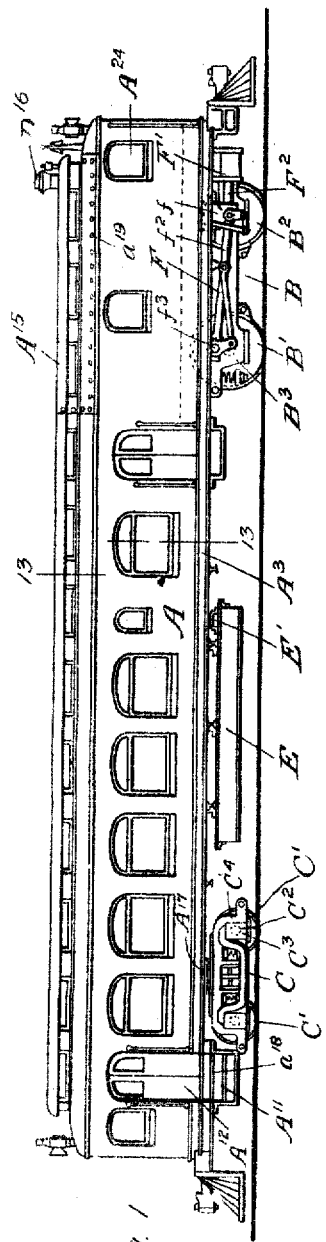

T. H. CURTIS.
RAILWAY STEAM MOTOR CAR.
APPLICATION FILED APR. 29, 1908.

920,114.

Patented May 4, 1909.
15 SHEETS—SHEET 1.

WITNESSES:
T. B. Townsend
A. W. Munday

INVENTOR
Theodore H. Curtis
BY
Munday, Evarts, Adcock & Clarke.
HIS ATTORNEYS

T. H. CURTIS.
RAILWAY STEAM MOTOR CAR.
APPLICATION FILED APR. 29, 1908.
920,114.
Patented May 4, 1909.
15 SHEETS—SHEET 2.
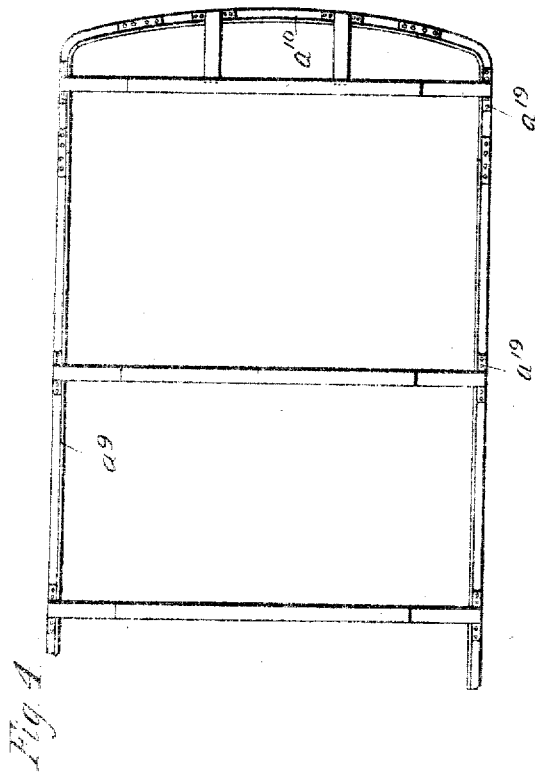
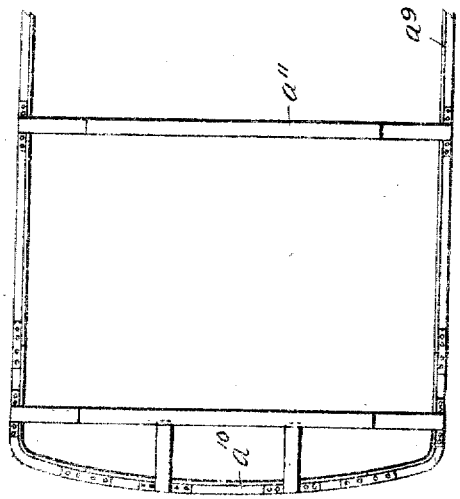
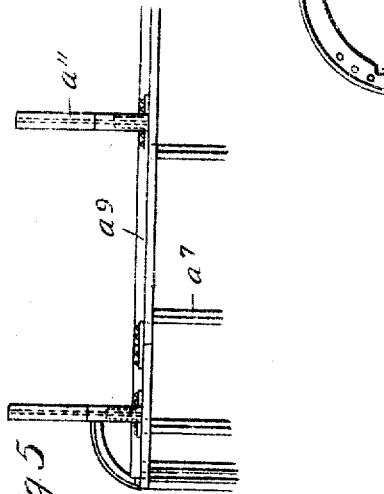

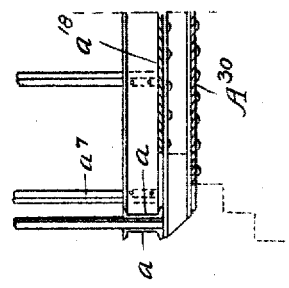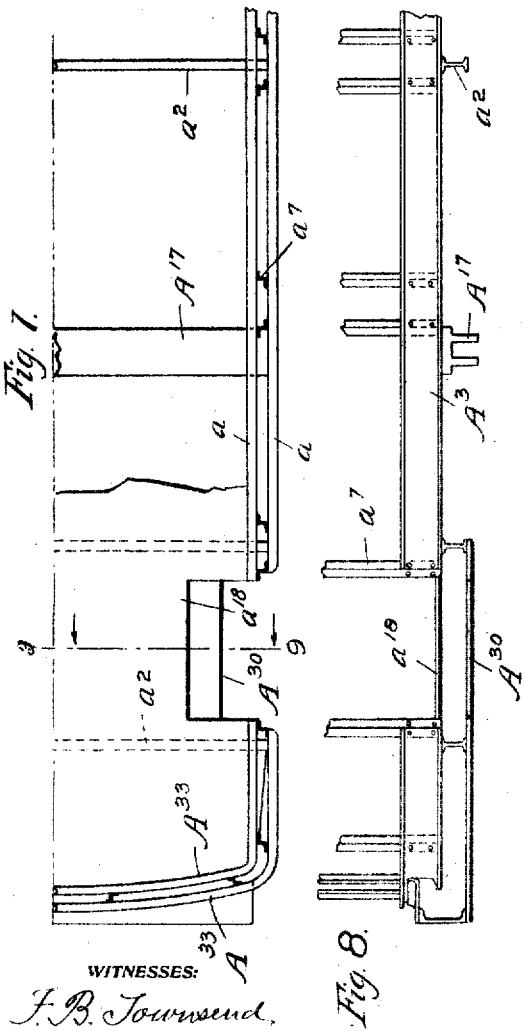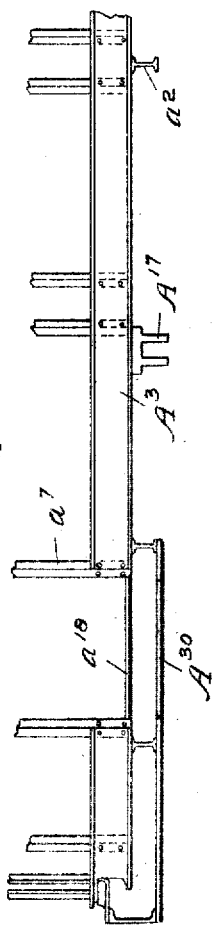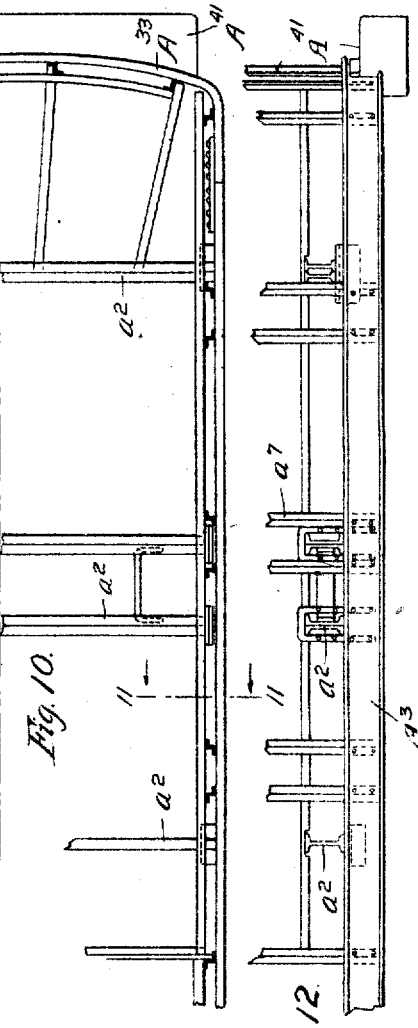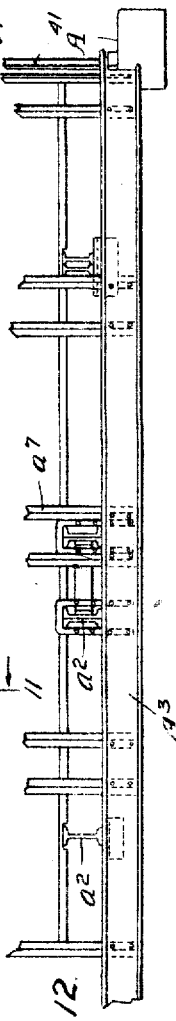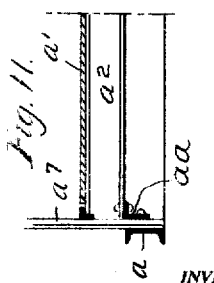

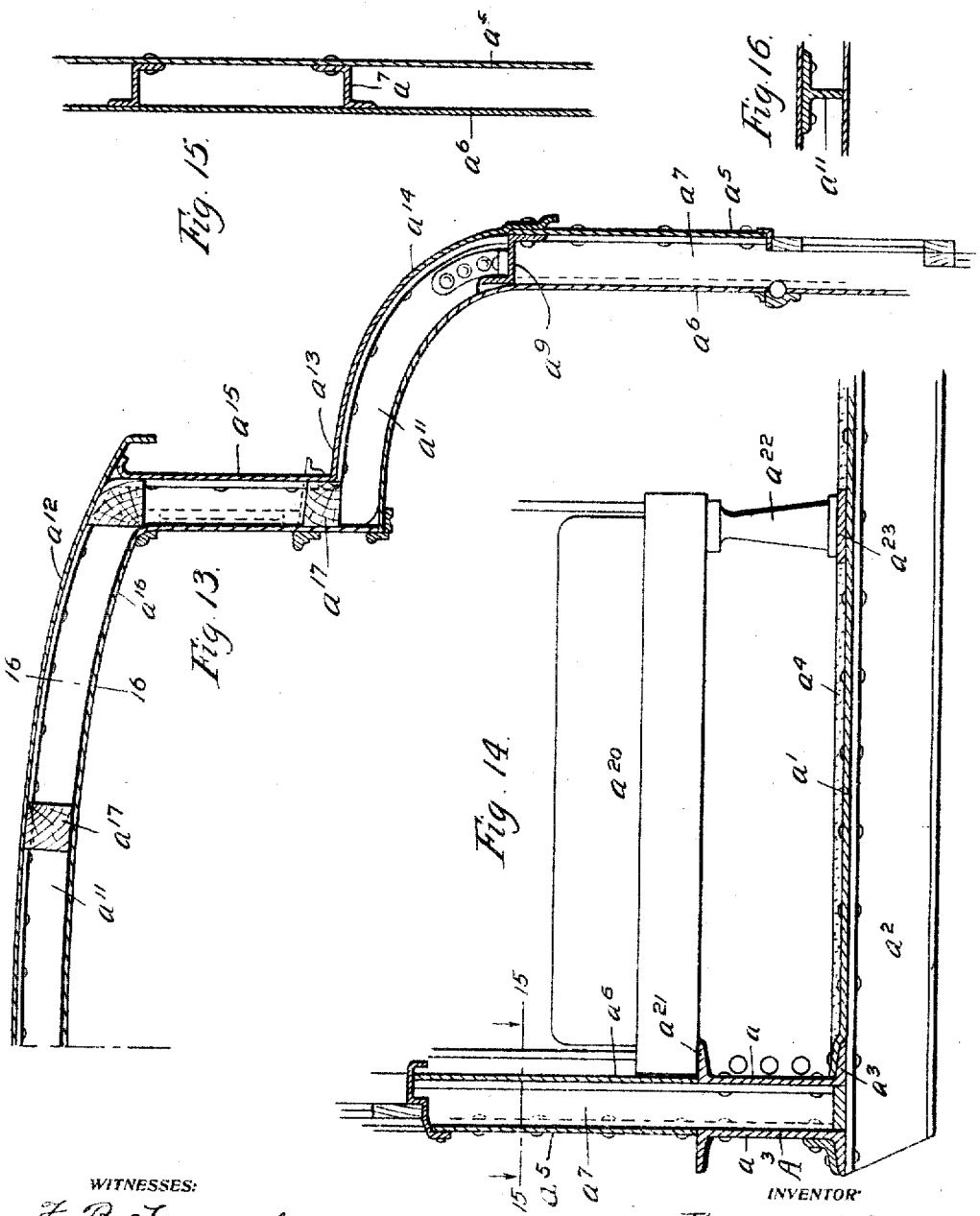

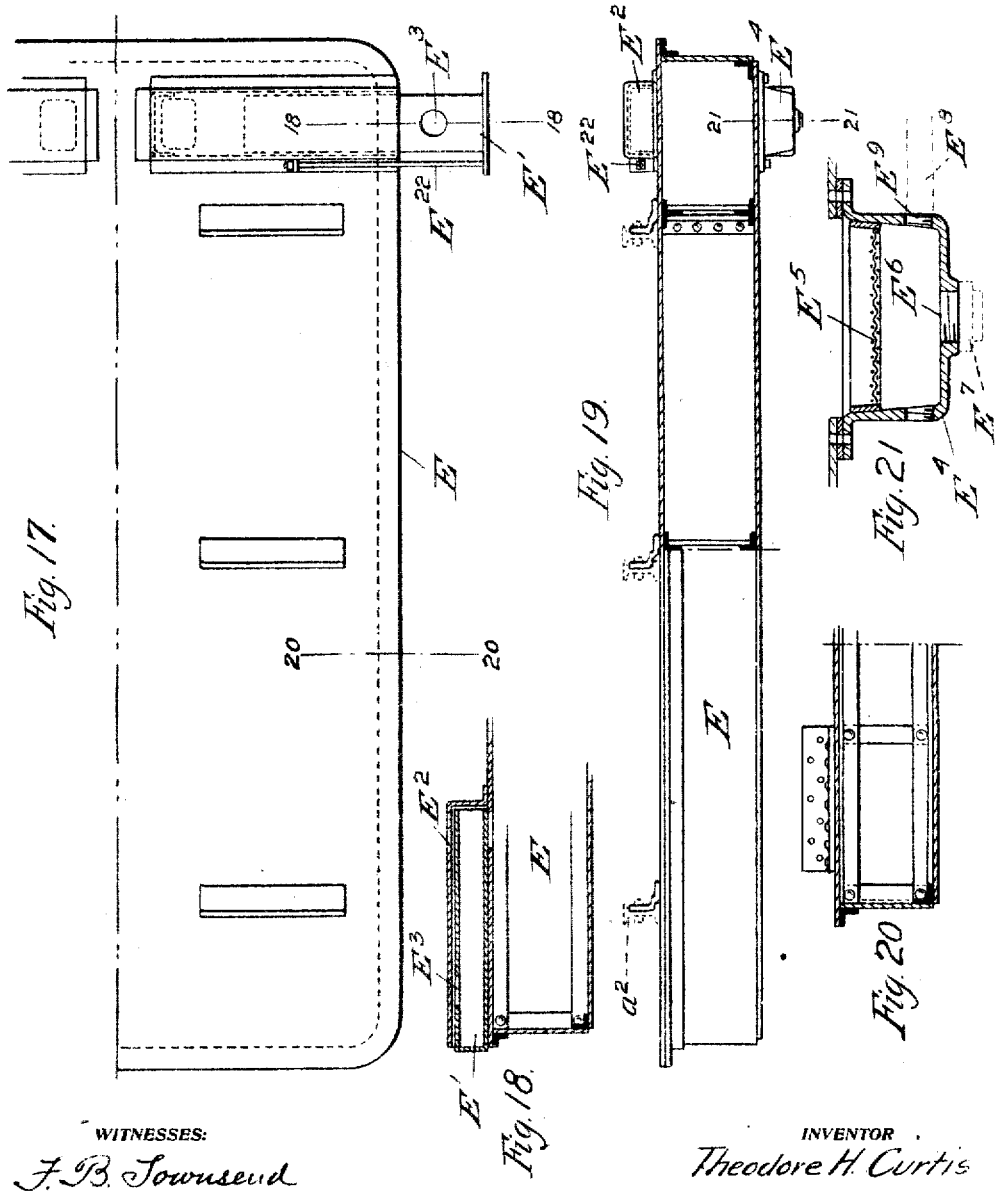

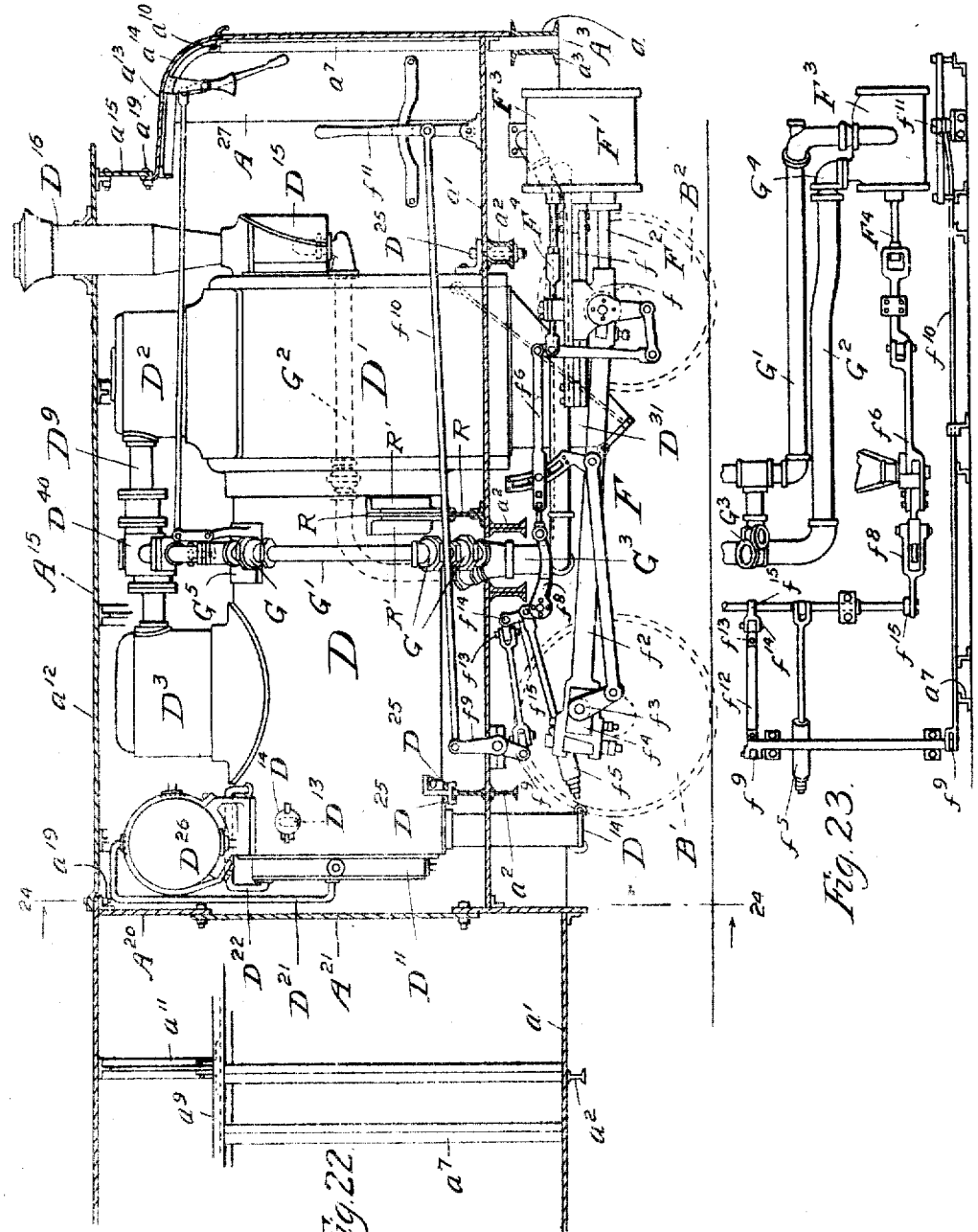

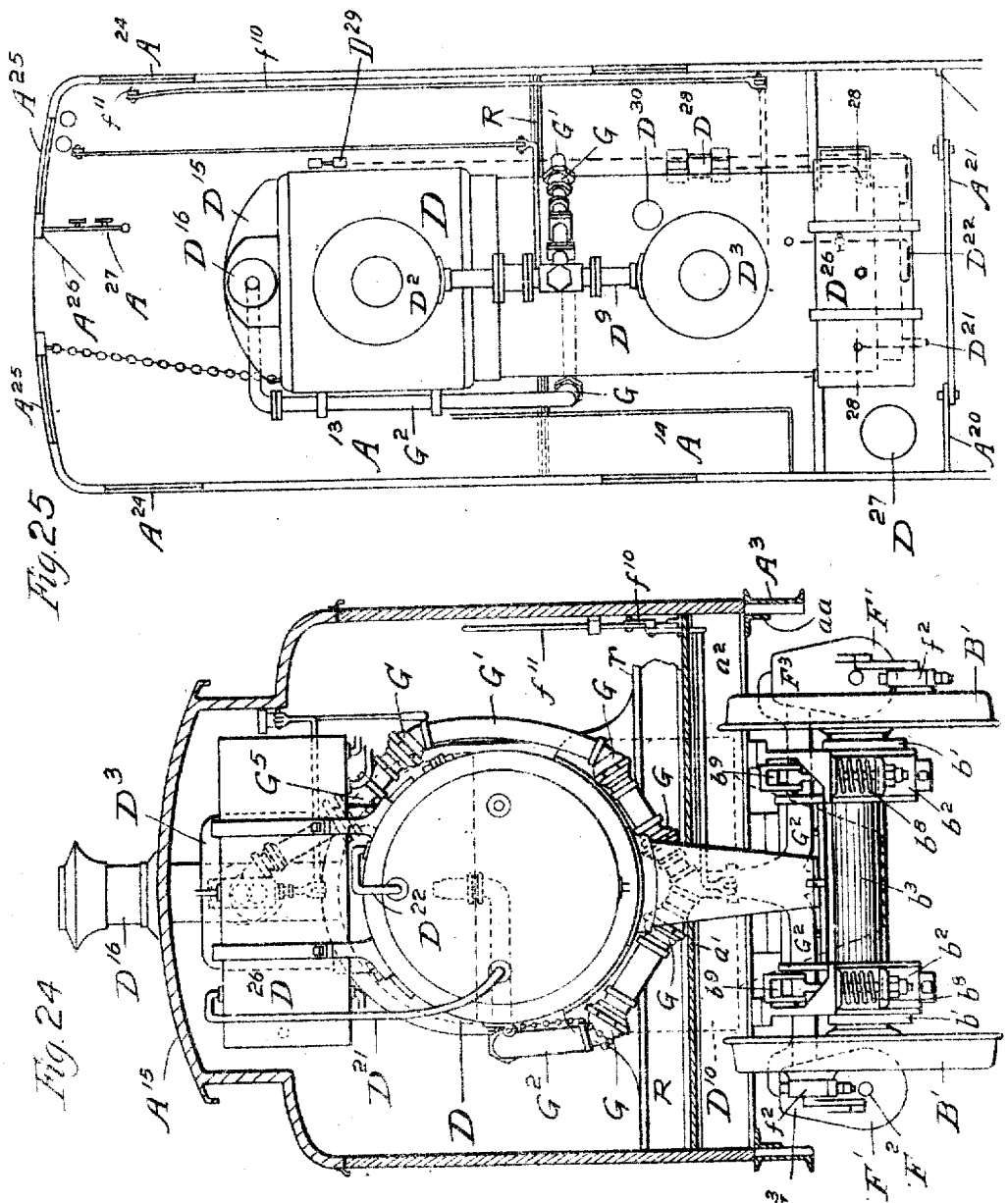

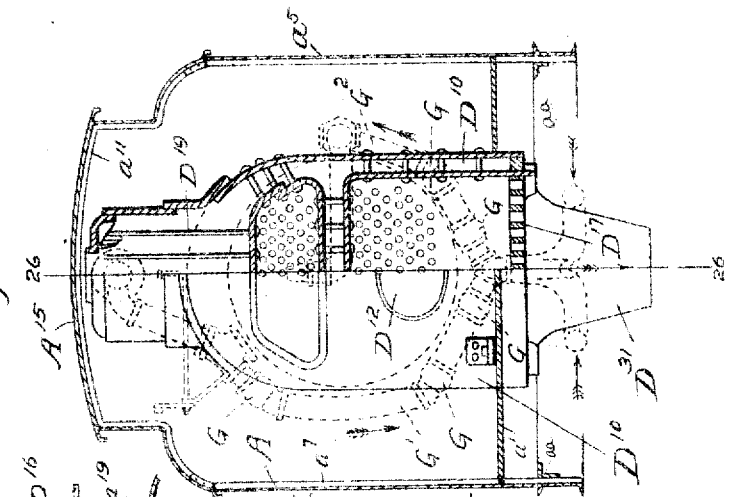

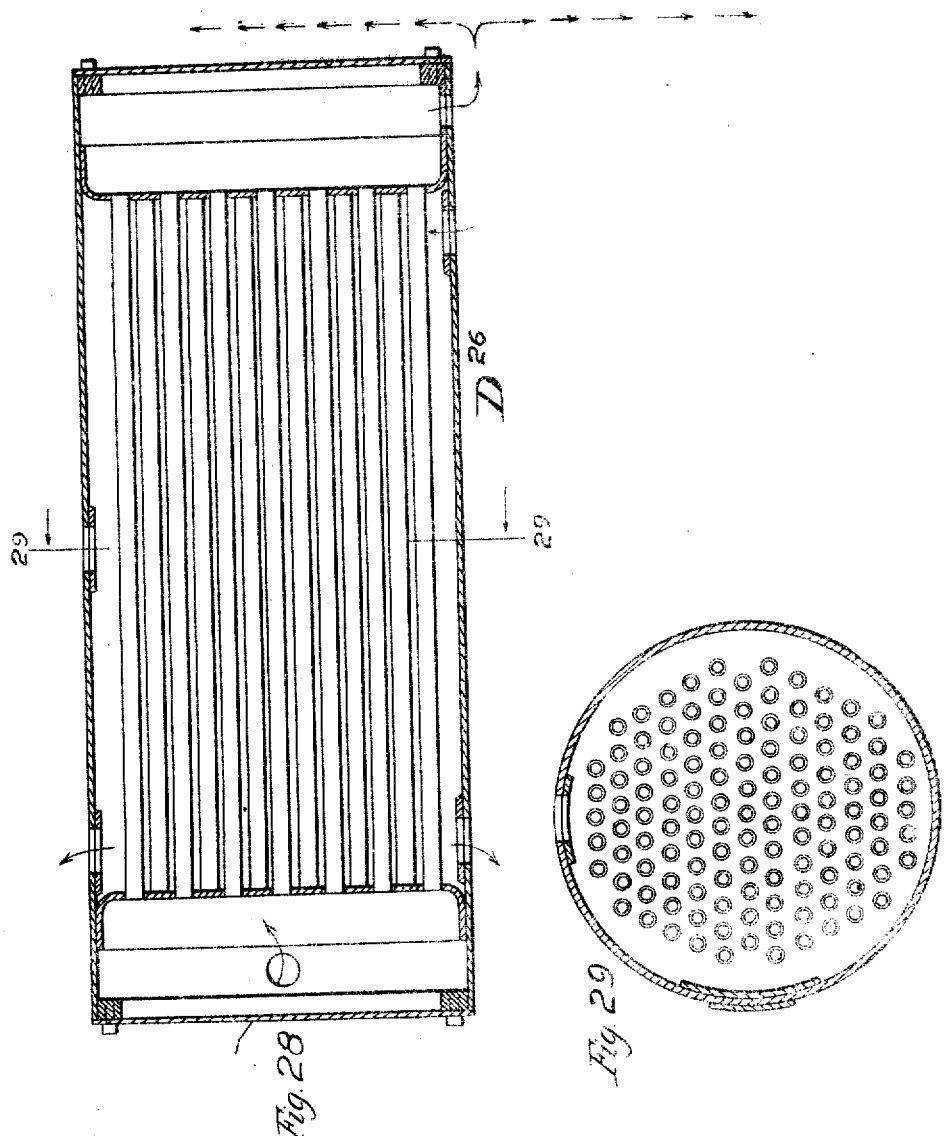

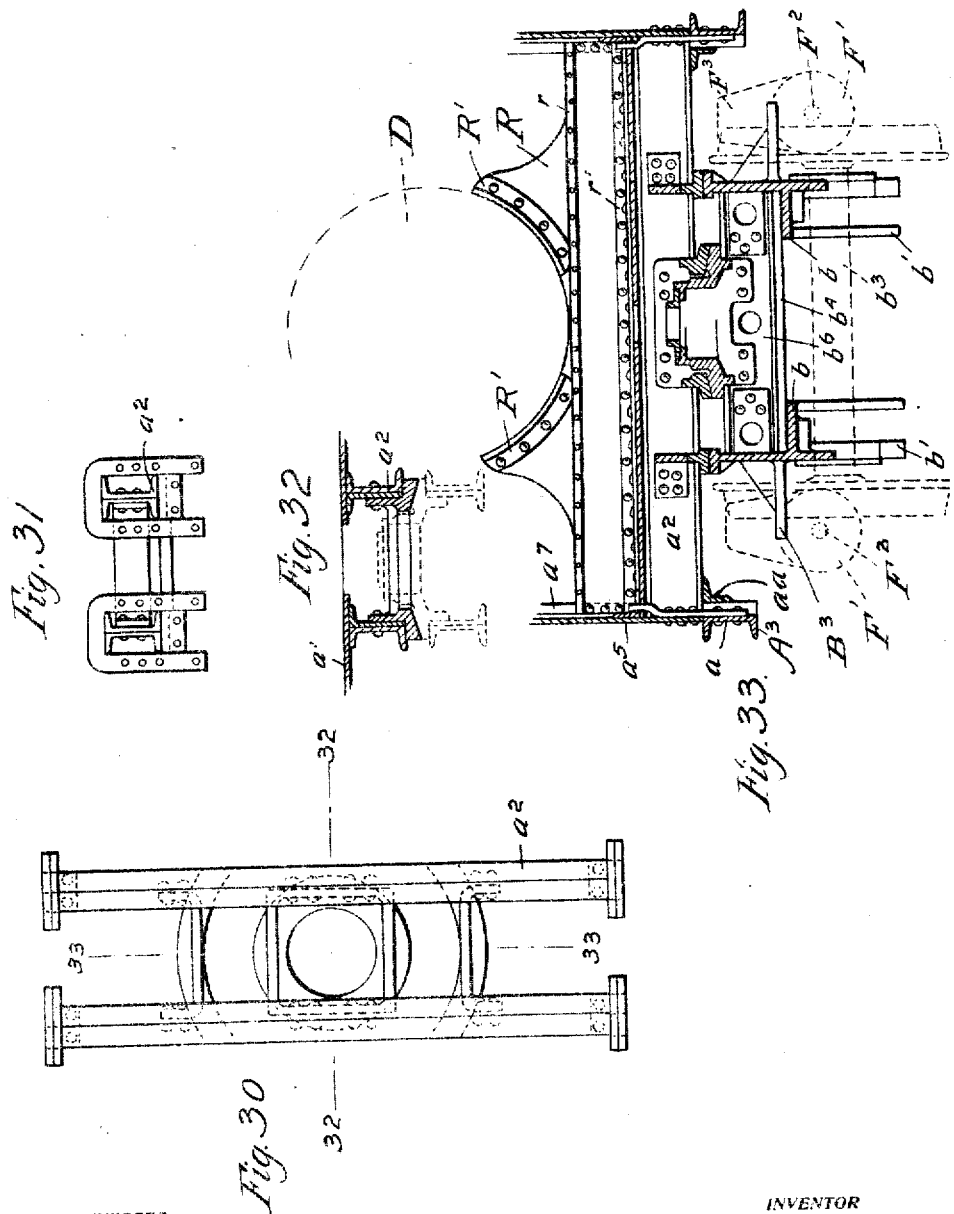

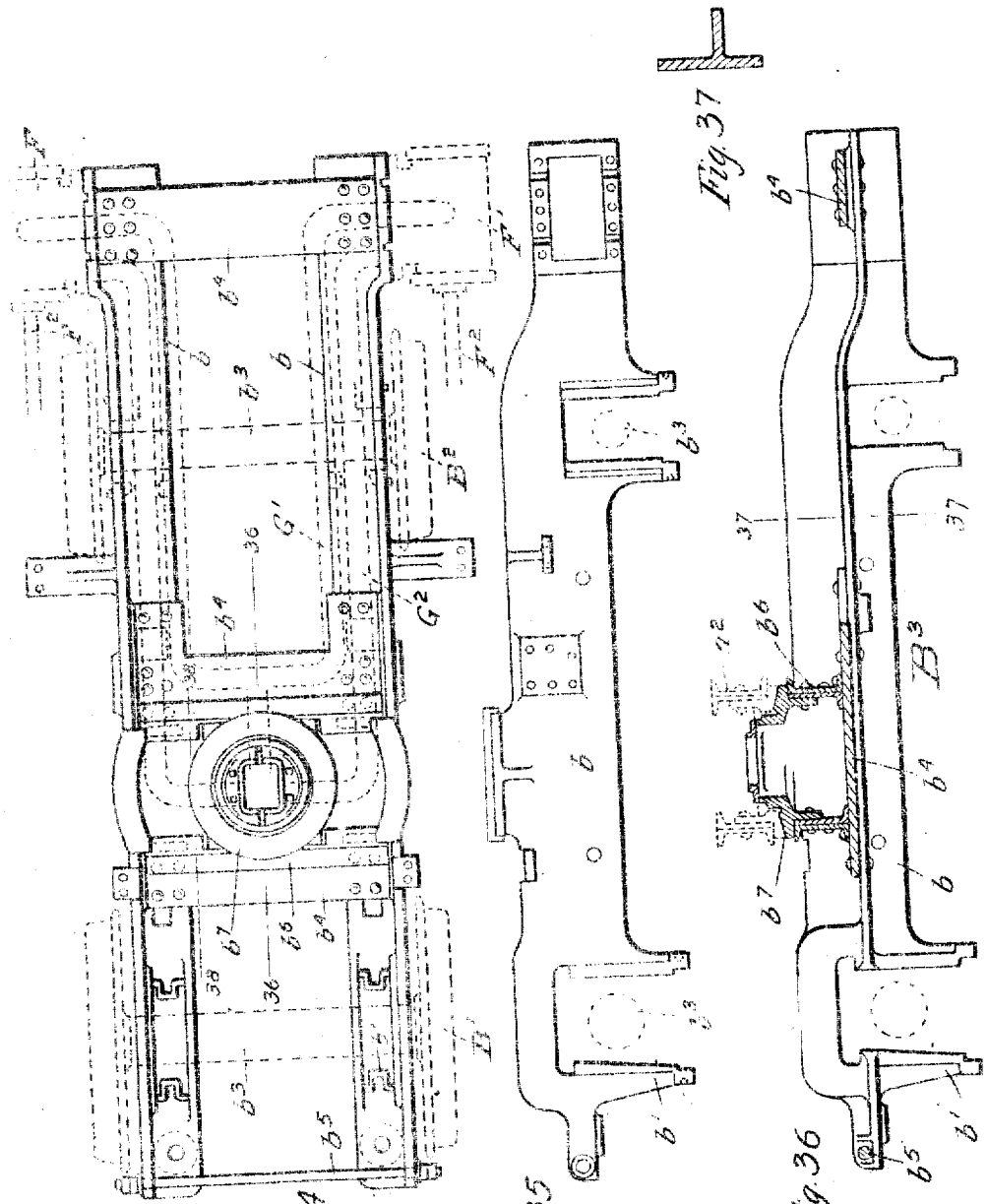

T. H. CURTIS.
RAILWAY STEAM MOTOR CAR.
APPLICATION FILED APR. 29, 1908.
920,114.
Patented May 4, 1909.
15 SHEETS—SHEET 12.
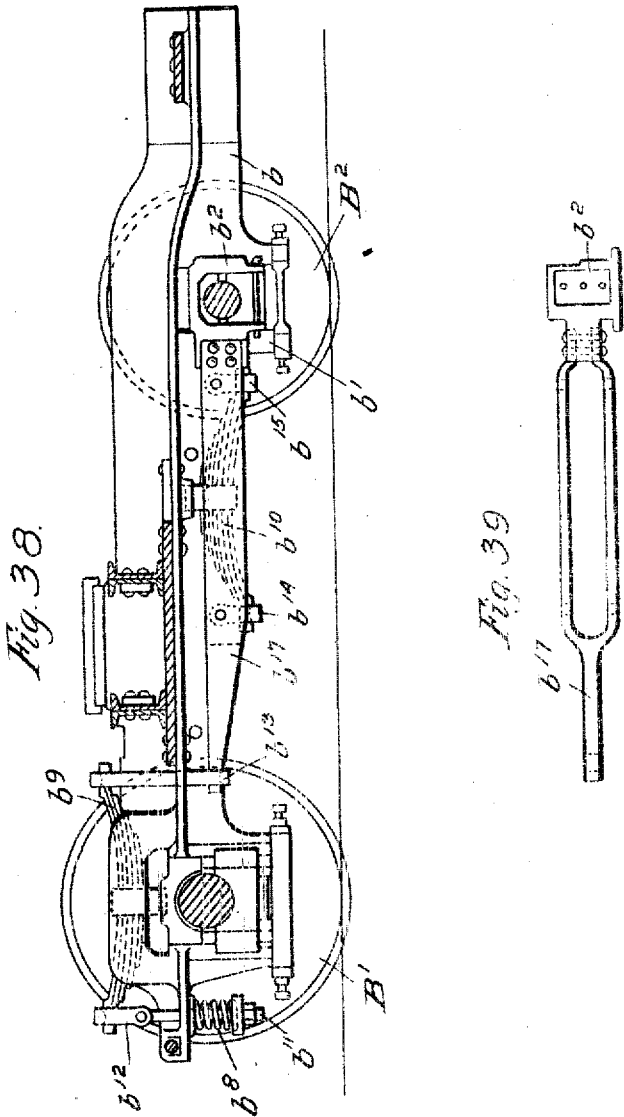
WITNESSES:
INVENTOR
Theodore H. Curtis
BY
HIS ATTORNEYS T. H. CURTIS.
RAILWAY STEAM MOTOR CAR.
APPLICATION FILED APR. 29, 1908.
920,114.
Patented May 4, 1909.
15 SHEETS—SHEET 13.
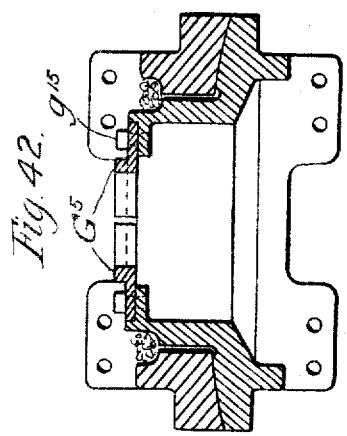
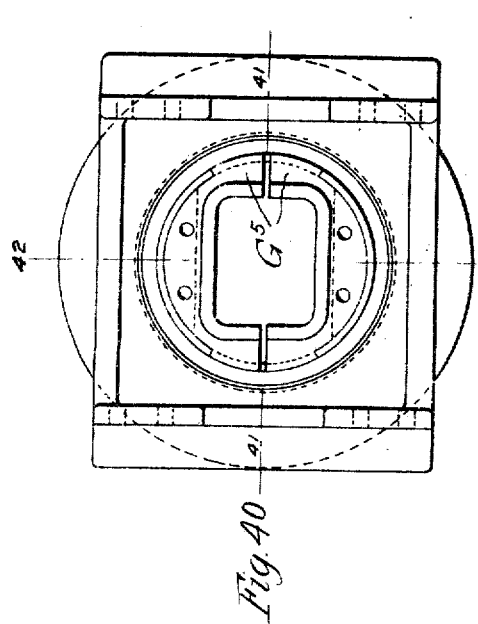
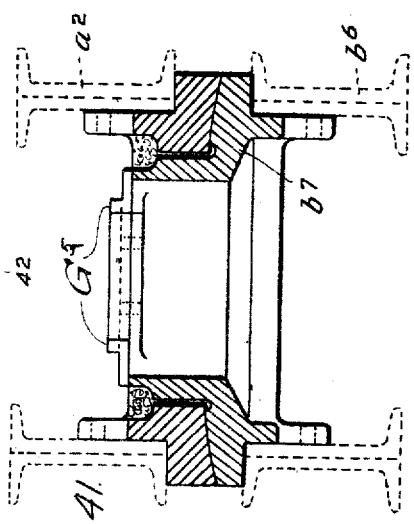
WITNESSES:
F. B. Townsend
N. W. Munday
INVENTOR
Theodore H. Curtis
BY
Munday, Evarts, Adcock & Clarke.
his ATTORNEYS

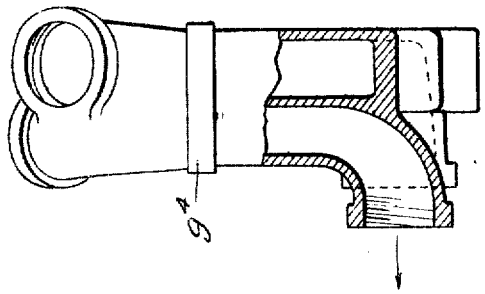
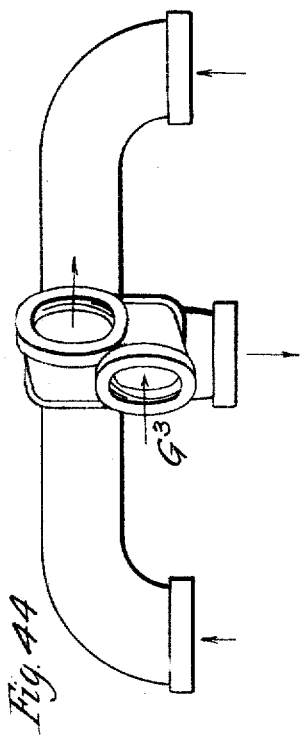
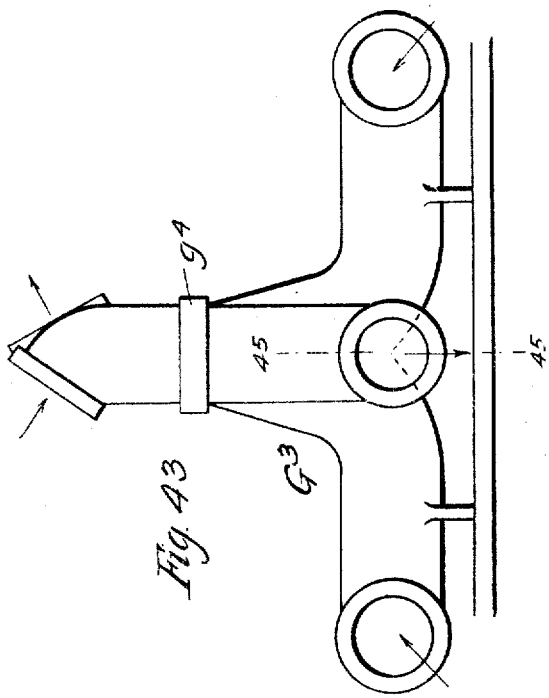

T. H. CURTIS.
RAILWAY STEAM MOTOR CAR.
APPLICATION FILED APR. 29, 1908.
920,114.
Patented May 4, 1909.
15 SHEETS—SHEET 15.
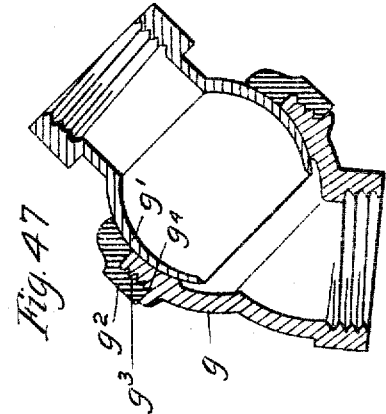
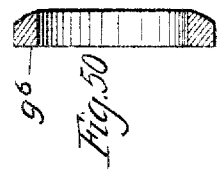
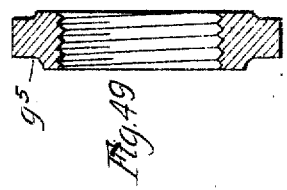
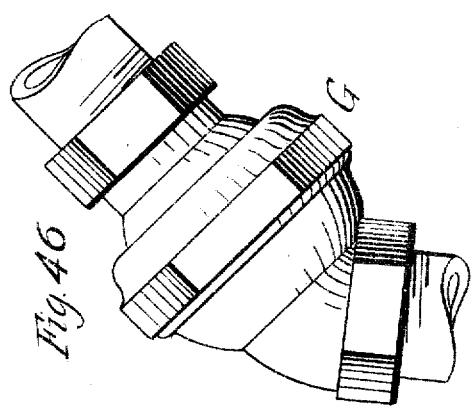
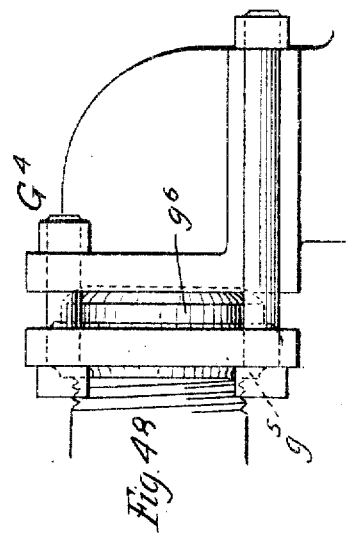
WITNESSES:
F. B. Townsend
INVENTOR
Theodore H Curtis
BY
Munday, Evarts, Adcock & Clarke
his ATTORNEYS

UNITED STATES PATENT OFFICE.

THEODORE H. CURTIS, OF LOUISVILLE, KENTUCKY.

RAILWAY STEAM-MOTOR CAR.

No. 920,114.   Specification of Letters Patent.   Patented May 4, 1909.

Application filed April 29, 1908. Serial No. 430,002.

*To all whom it may concern:*

Be it known that I, THEODORE H. CURTIS, a citizen of the United States, residing in Louisville, in the county of Jefferson and State of Kentucky, have invented a new and useful Improvement in Railway Steam-Motor Cars, of which the following is a specification.

My invention relates to railway motor cars.

Heretofore for suburban and interurban passenger service, two well known systems or means of transportation have generally been used; the one consisting of the ordinary railway train, comprising a locomotive, its tender and a number of passenger coaches, and the other the ordinary trolley or electric motor cars. Both of these old systems of passenger transportation, however, are open to serious objections and afford under most conditions of passenger traffic a very inadequate and imperfect service, and fail in many respects to meet public requirements. And in many cases, the conditions of passenger traffic are such that neither of these old systems can be practically or profitably employed at all.

The ordinary suburban passenger train composed of a locomotive, its tender and a number of passenger coaches coupled together, considered as a single transportation unit, is expensive to manufacture and maintain, requires three or more skilled men to run it, a conductor, engineer, fireman and brakeman, is incapable of stopping or starting quickly on account of its great inertia, and consequently must make either slow time or infrequent stops or both, and the expense incident to the employment of a separate locomotive and tender, engineer and fireman are such that it is unprofitable or impracticable unless quite a number of well filled passenger coaches are carried on each train. These conditions necessarily require it to be run at infrequent intervals (except during rush hours at large cities where the passenger traffic is very heavy,) thus rendering the service very imperfect, inconvenient and unsatisfactory to the public.

The ordinary trolley or electric motor car, while it possesses many advantages over the steam locomotive railway train as a means of suburban and interurban passenger transportation, such for example as that it can be stopped and started quickly, and thus can make frequent stops and comparatively quick time, and that it required only two men to run it, a conductor and motorman, and can consequently be practically run at frequent intervals; still, although for these and other reasons, it affords a much superior service under many conditions of passenger traffic to the railway train, it nevertheless is open to other objections which very greatly circumscribe and limit its practical and profitable use, such as the limited extent of line that can be economically operated from a single power plant, and its great initial cost, in part due to the necessity for an expensive power plant, trolley and transmission wiring and track bonding and for a separate and distinct right of way. The expense incident to procuring a separate right of way is often alone so great as to make the use of the electric motor car absolutely prohibitive; and in fact it can only be profitably used where the passenger traffic is comparatively heavy. Notwithstanding the great expense of the trolley or electric motor car system, its advantages over the ordinary railway suburban train are nevertheless such, and its service so superior, that where the towns or cities along a line of railroad are sufficiently large and close together, the railroad has been profitably paralleled by an electric car line, in many instances.

The object of my invention is to provide a railway steam motor car of a simple, efficient, durable and practical construction, which will require but two persons for its operation, which may be handled or operated by the ordinary trainmen of a railroad, which may be run upon its right of way and thus obviate the necessity and expense of a separate right of way, which may be profitably run at frequent intervals like the ordinary electric motor car, even where the passenger traffic is light, which may make quick time, high speed and frequent stops, in which the locomotive engine and its boiler may be quickly and conveniently removed for overhauling or repair, in which the seating portion of the car will be free from jar or vibration due to the engine, which may use the ordinary coal commonly employed upon railway locomotives for fuel, which will have a free quick steaming or high duty construction of boiler without interfering with the necessary seating or carrying capacity of the car; in which the large drivers essential for the high speed of the locomotive engine will not interfere with easy accessibility of passengers to the seating portion of the car, or with the use of a large fire box and high duty boiler, in which the cylinders of the locomotive engine may be of the required size and high capacity necessary for effective operation without interfering with the other parts, in which the operative parts of the engine will be on the outside of the drivers and locomotive truck side frame and readily accessible for lubrication, inspection and repair, which will be double ended or capable of being run in either direction, and in which the seating or passenger portion of the car will be properly separated and insulated from the boiler or heating portion thereof.

In other words, the object of my invention is to provide a railway steam motor car which will have all the advantages of the trolley or electric motor car without any of its drawbacks or disadvantages and which will at the same time possess the advantages of the ordinary steam locomotive railway train without any of its disadvantages.

To practically accomplish this object or result, and herein my invention consists, I have devised and combined together a locomotive car body and locomotive truck, engine and boiler, specially constructed, adapted and arranged for mutual coöperation with each other, and by their joint action to successfully produce the unitary result which is the object of the invention.

To adapt the body of the vehicle, which, for convenience I term a locomotive-car-body for effective coöperation with the other parts without interference with their necessary functions or its own in the combination as a whole, I construct it without center sills or intermediate longitudinal sills, but with strong, deep side sills extending from end to end and with a raised floor portion for receiving a high duty boiler having the necessary wide, deep fire box, and for accommodation under it, of the large drivers, necessary for the locomotive truck in order to secure speed, and provide said body with a depressed floor at the remaining portion thereof for receiving the passenger seats and for convenient ingress and egress of passengers thereto. And to adapt the necessary quick steaming high duty boiler for effective coöperation with the other parts without interfering with their necessary functions or its own, I provide it with primary and secondary flue chambers and with primary and secondary flues and with a wide deep fire box having ample grate area so that the boiler may have the necessary large heating surface, and at the same time be short or of such limited length as not to interfere with the seating or passenger carrying capacity of the car as a whole. And said high duty boiler I firmly but removably secure in the locomotive car body so that it may be bodily removed therefrom for overhauling or repairs, the locomotive car body being provided with a removable roof section over the boiler to enable this to be done. To adapt the locomotive truck and engine for effective coöperation with the other parts without interfering with their necessary functions or its own, I construct it with the large drivers necessary for high speed and with small front wheels and with a low truck frame, the small front wheels being under the deep fire box portion of the boiler and the large drivers being at the rear thereof so that the small portion of the boiler comes over the large drivers and the large or wide deep fire box portion of the boiler comes over the smaller wheels of the locomotive truck, the engine having large cylinders and all its operative parts outside the locomotive truck wheels and side frames, so as to be readily accessible for lubrication, inspection or repairs, and so that the necessary large, high capacity engine cylinders will not be cramped or interfered with by the locomotive truck frame or boiler fire box.

To enable the boiler on the locomotive car body and the engine on the locomotive truck to practically coöperate with each other, and the body and truck at the same time to have the necessary center-plate or swiveling connection with each other as required for passing around curves and practical operation, I provide the steam conduits or pipes extending from the boiler to the engine with a plurality of flexible or ball and socket joints so that the truck and body may move in all directions without breaking, cramping or straining the steam pipes or loosening their joints. And to further accomplish this function, I provide said steam conduits or pipes with a manifold member or connecting casting which extends up through the center plates of the locomotive truck and locomotive-car-body, said center plates being enlarged to receive said connecting member or casting. And to limit as far as possible the play and wear between the ball and socket members of these flexible joints in the steam pipes or conduits, I locate all the same as near to the center plates as practicable.

To enable a separate tender to be dispensed with, and my railway steam motor car to be practically operated by two men, a conductor and an engineer, without a separate fireman, I provide the locomotive car body with a coal or fuel bunker at one side of the boiler extending to the front end of said body, and furnish the same with a forwardly inclined bottom, and arrange the fire door at the front end of the fire box adjacent to the engineer's floor or section and adjacent to the reverse or controlling lever of the engine, throttle lever, brake lever and other manipulating appliances. To enable the reverse or controlling lever of the engine to be practically mounted upon the locomotive car body and thus be free from all oscillatory or vibratory movements of the locomotive truck and engine as required for safety and certainty of operation, and at the same time enable the reverse or controlling valve on the engine to receive positive and certain movement from said reverse or controlling lever on the locomotive car body, I provide the connecting mechanism between the reverse lever and the engine valve with a toggle or two-way connection and locate the same near the center plates.

My invention further consists in a railway steam motor car comprising in combination, a locomotive truck having large driving wheels and small front wheels and a low truck or engine frame; a trailer truck; a locomotive car body having a swivel or center plate connection with each truck and deep continuous side sills and without center sills, provided at one end with a raised-floor boiler-portion for receiving a high duty locomotive boiler and for accommodation under it of said locomotive truck, and furnished with a depressed floor portion for receiving the passenger seats and for convenient ingress and egress of passengers thereto; a short, large, quick steaming, high duty boiler having a wide deep fire box and ample grate area removably secured to said locomotive car body at the raised floor portion thereof with its fire box end or portion over the small wheels of the locomotive truck and its other or small end over the large drivers of said locomotive truck; a high capacity large cylinder locomotive engine rigidly mounted upon the locomotive truck outside of said wheels and side frame; steam conduits or pipes extending between the boiler on the locomotive car body and the engine on the locomotive truck and having a connecting member or casting extending up through the center plates of said locomotive truck and locomotive-car-body, and a plurality of flexible ball and socket connections in said steam pipes or conduits arranged adjacent to said center plates.

My invention further consists in the novel construction of parts and devices and in the novel combinations and sub-combinations of parts and devices herein shown and described.

Figure 2:
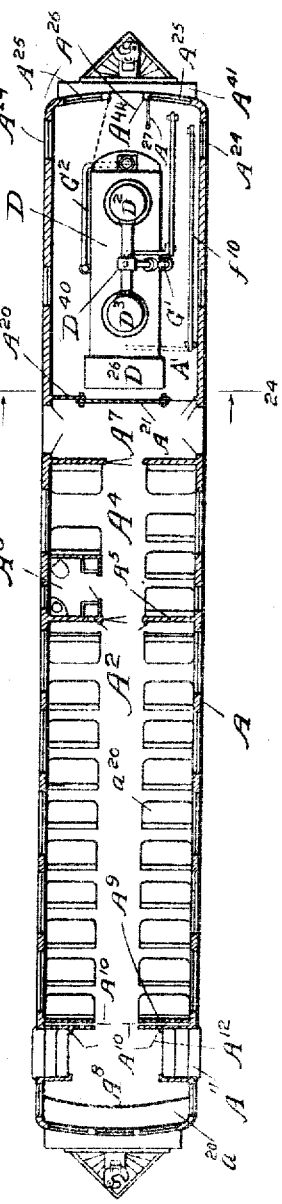
Figure 3:
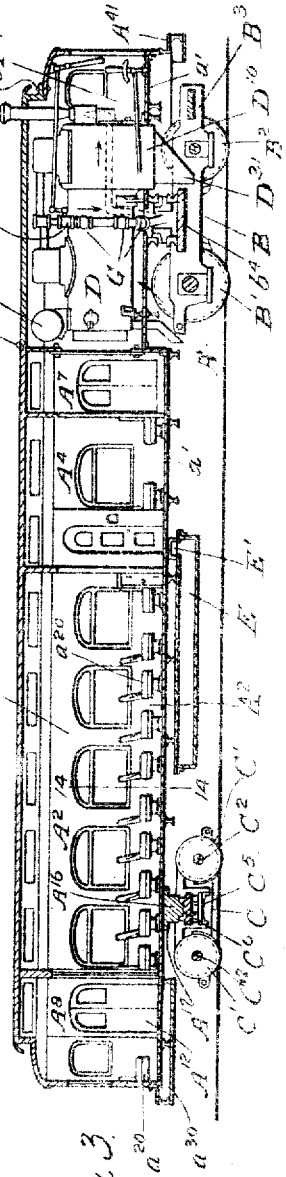

In the drawing forming a part of this specification, Figure 1 is a side elevation of a railway steam motor car embodying my invention. Fig. 2 is a diagrammatic plan view partly in horizontal section. Fig. 3 is a diagrammatic interior elevation partly in central vertical longitudinal section. Fig. 4 is a detail plan view of the roof frame. Fig. 5 is a detail elevation of the roof frame. Fig. 6 is a detail elevation of one of the roof frame members or raf    Fig. 7 is a partial horizontal section showing in plan the frame construction at the passenger or seating portion of the car. Fig. 8 is a detail side elevation of the car body frame at the passenger or seating portion. Fig. 9 is a detail section on line 9—9 of Fig. 7. Fig. 10 is a partial horizontal section showing the frame construction at the engine or boiler end of the car. Fig. 11 is a detail section on line 11—11 of Fig. 10. Fig 12 is a detail elevation showing the car body frame construction at the engine or boiler end thereof. Fig. 13 is an enlarged partial vertical section on line 13—13 of Fig. 1. Fig. 14 is an enlarged partial vertical section on line 14—14 of Fig. 3. Fig. 15 is an enlarged detail horizontal section on line 15—15 of Fig. 14. Fig. 16 is a detail section on line 16—16 of Fig. 13. Fig. 17 is a detail plan view of the water tank. Fig. 18 is an enlarged detail section on line 18—18 of Fig. 17. Fig. 19 is a detail elevation partly in vertical section of the water tank. Fig. 20 is a detail section on line 20—20 of Fig. 17 and Fig. 21 is a detail section on line 21—21 of Fig. 19. Fig. 22 is a detail diagrammatic elevation of the boiler and engine. Fig. 23 is a detail plan view of the reverse lever mechanism of the engine. Fig. 24 is a detail end elevation of the boiler and engine partly in section on line 24—24 of Fig. 22. Fig. 25 is a diagrammatic plan view of the locomotive boiler end of the car. Fig. 26 is a detail central vertical longitudinal section through the boiler, on line 26—26 of Fig. 27. Fig. 27 is an end elevation of the boiler partly in section on line 27—27 of Fig. 26. Fig. 28 is a detail section of the feed water heater on line 28—28 of Fig. 25. Fig. 29 is a detail cross section of the feed water heater on line 29—29 of Fig. 28. Fig. 30 is a detail plan view showing the body bolster for the front end of the car. Fig. 31 is a detail end view of same. Fig. 32 is a detail section on line 32—32 of Fig. 30. Fig. 33 is a detail vertical cross section on line 33—33 of Fig. 30. Fig. 34 is a detail plan view of the locomotive truck frame. Fig. 35 is a detail side elevation of same. Fig. 36 is a detail section on line 36—36 of Fig. 34, showing certain parts in elevation. Fig. 37 is a detail section on line 37—37 of Fig. 36. Fig. 38 is a detail elevation partly in vertical section on line 38—38 of Fig. 34 showing the spring equalizers. Fig. 39 is a detail plan of the locomotive truck frame spring equalizer. Fig. 40 is a detail plan view of the locomotive car body and locomotive-truck-frame plates. Fig. 41 is a detail vertical section on line 41—41 of Fig. 40. Fig. 42 is a detail section on line 42—42 of Fig. 40. Fig. 43 is a detail elevation of the manifold steam joint connection. Fig. 44 is a detail plan view of same. Fig. 45 is a detail elevation partly in section on line 45—45 of Fig. 43. Fig. 46 is a detail elevation of one of the flexible or ball and socket joint connections. Fig. 47 is a detail section of same. Fig. 48 is a detail plan of another of the flexible or ball and socket connections. Fig. 49 is a detail section of a steam joint connection piece as used at the steam chest connection and Fig. 50 is a detail section of a steam joint connecting piece.

In the drawing, A represents my new locomotive car body, having a high or raised floor portion $A^1$ at its front end over the locomotive truck, and a low or depressed floor portion $A^2$ for the remainder of its length at the seating or carrying portion thereof; B is the locomotive truck having large drive wheels $B^1$ at its rear end, and smaller wheels $B^2$ at its front end and a low truck or engine frame $B^3$; C is the trailer truck; D, a short, large, high duty steam generating boiler, having a wide deep fire box $D^{10}$ at its front end over the small wheels of the locomotive truck and removably and firmly secured to the locomotive car body; E the water tank secured beneath the low or depressed portion of the locomotive car body; F a high capacity engine mounted upon the locomotive truck outside the side frames thereof, so that all parts will be readily accessible for inspection, lubrication or repair; and G are universal or ball and socket connections in the steam pipes which extend between the boiler on the locomotive car body and the engine on the locomotive truck; each and all of these principal elements of my invention are especially adapted, constructed and designed for mutual coöperation with each other, and to enable the structure as a whole to practically and efficiently accomplish the unitary object or result hereinabove set forth.

To adapt the locomotive car body for practical and efficient coöperation with the steam generating boiler removably mounted thereon and with the locomotive engine on the locomotive truck, and to keep the floor low at the seating portion $A^1$ for convenient access of passengers, and to have the same properly raised to admit the use of large locomotive driving wheels, and to provide room for a wide deep fire box, all of which are essential for successful operation, and at the same time give to said locomotive-car-body the requisite strength for sustaining the steam generating boiler and the passenger or other load of the car, I construct the locomotive-car-body with strong deep side sills $A^3$, preferably each composed of a pair of channel beams $a$ placed back to back, and without any center sills or other intermediate longitudinal sills between said side sills. And at the raised or high floor portion $A^1$, the floor $a^1$ consists of steel plates secured to cross beams $a^2$ resting upon the upper edges or flanges of the channel beams $a$ of the side sills $A^3$, while at the depressed or seating portion of the body A, the floor plates $a^1$ are secured on top of cross beams $a^2$ which fit against the lower edges or flanges $a^3$ of said channel beams $a$. In this way the locomotive car body is provided with deep, strong continuous side sills extending continuously through both the locomotive section of the body and the passenger or seating section thereof, while at the same time the floor between the two sections is stepped to an extent equaling the vertical depth of the side sills and the depth of the cross beams.

At the passenger or seating section of the body A, the steel floor plates $a^1$ are furnished with a cork or other elastic lining $a^4$. The upright walls of the car body are made double and consist of outer steel plates $a^5$ and an inner lining of wood $a^6$ secured to steel bar studs or uprights $a^7$, preferably of a Z shape. At the boiler end of the body A, no inner lining is employed. The roof framework preferably consists of longitudinal side and end plates $a^9$ $a^{10}$, preferably of steel Z bar sections and metallic rafters $a^{11}$, preferably of steel T sections, all securely riveted together.

The roof is composed of outer steel top plates $a^{12}$ and intermediate or cornice plates $a^{13}$, having curved members $a^{14}$ and upright members $a^{15}$, and an inner lining member $a^{16}$, preferably of wood, the outer steel plates and inner lining being separated by longitudinally extending wood filler blocks $a^{17}$.

The seating or passenger portion of the locomotive car body A is provided with a smoking compartment $A^4$ separated by partition $A^5$, and with one or more toilet rooms $A^6$. The locomotive car body A is also furnished with a baggage compartment $A^7$, between the locomotive boiler section $A^1$ and the seating or passenger section $A^2$ thereof, which also serves as a heat insulating means between the boiler section and the passenger section of the car. The locomotive car body A is further provided at its extreme end with a vestibule $A^8$, separated from the seat section $A^2$ by an upright partition $A^9$, furnished with floors $A^{10}$. The vestibule section $A^8$ is furnished with steps $A^{11}$ and doors $A^{12}$. The upper step plate $a^{18}$ is a heavy steel plate extending across the body of the car at the step section thereof where the side sills $A^3$ are cut away to make room for the steps, and this heavy steel step plate serves as a frame plate or reinforcement for the framework of the car body A.

The steel channels $a$ $a$ comprising the side sills $A^3$ have continuous curved end extensions or members $A^{33}$ constituting the end sills of the locomotive car body. At the steps $A^{11}$ where the end sills $A^3$ are cut away to accommodate the steps, a combined step and frame plate $A^{30}$, preferably a steel plate about one half inch in thickness and extending the width of the body A and from the cross beam $a^2$ in front of the steps to the rear end of the body A serves in connection with the steel plate $a^{18}$ which takes the place of floor plates $a^1$, to bridge the cut away portion of the side sills and to afford a strong and effective continuation of the framework, giving support to the vestibule end $A^8$ of the body A.

The locomotive car body A is provided at its boiler section $A^1$ with a removable roof section $A^{15}$, removably secured by bolts $a^{19}$ to the main roof section and to the upright walls of the body A at the boiler section thereof, so that the steam generating boiler D may be bodily lifted out of the locomotive car body by means of a suitable crane for purposes of overhauling or repairs when required. The removable roof section $A^{15}$ of the body A is preferably of the same construction as the remainder of the roof, both as to its walls and framework, and only differs in being removably secured in place by the bolts or other removable fastening devices $a^{19}$. The vestibule portion $A^8$ of the locomotive car body B is furnished with transversely extending seat $a^{20}$ so that the vestibule may be utilized to increase the seating capacity of my railway steam motor car. The seats $a^{20}$ in the seat section $A^2$ of the locomotive car body A are supported at one end upon the upper flange $a^{21}$ of the inner channels $a$ of the side sills $A^3$, and at the outer ends upon seat pedestals $a^{22}$ secured to base strips $a^{23}$, preferably of wood, which are attached to the steel floor plates $a^1$.

The steel floor plates $a^1$ are preferably about one quarter inch thick and the steel wall plates $a^5$ and steel roof plates $a^{12}$ $a^{13}$ are preferably of substantially the same thickness, so that the steel floor, wall and roof plates, being all securely riveted together and to the cross beams $a^2$ and uprights or studs $a^7$ and roof members or rafters $a^{10}$, these floor, wall and roof plates themselves serve in a measure as a framework for my locomotive-car-body, and very greatly reinforce, strengthen and stiffen the frame members proper thereof.

The locomotive truck B has large driving wheels $B^1$, preferably about 50 inches in diameter, and small front wheels $B^2$, preferably about 40 inches in diameter which fit within or between the side sills of the locomotive car body, as will be readily understood from Figs 1 3 and 24, and it has a low frame $B^3$ which fits under the cross beams $a^2$ that extend across the car and fit above the side sills $A^3$ at the locomotive section $A^1$ of said body A. The locomotive truck frame $B^3$, preferably consists of a pair of cast steel side frames $b$, having pedestal $b^1$ to receive the journal boxes $b^2$ of the axles $b^3$ and connected together by steel tie-plates $b^4$, tie bolt $b^5$, and truck bolster $b^6$ furnished with center plates $b^7$. The locomotive truck frame is furnished with coiled springs $b^8$ and leaf springs $b^9$ $b^{10}$ interposed between the journal boxes and the truck frame, and with suitable hangers for said springs $b^{11}$ $b^{12}$, $b^{13}$, $b^{14}$, $b^{15}$ and equalizer bars $b^{17}$. Each of the equalizer bars $b^{17}$ is preferably made integral with or rigidly secured to the front journal box $b^2$ at the rear side thereof so that the equalizer bars will not be on top of the journal boxes or necessitate a high truck over the front box or interfere with the use of a deep fire box for the steam generating boiler.

The trailer truck C may be of any ordinary, desired or approved railway passenger car construction. It comprises two pairs of car wheels $C^1$, axles $C^2$, journal boxes $C^3$, truck side frames $C^4$, truck bolsters $C^5$, truck center plate $C^6$ which coöperate with the center plate $A^{16}$ on the rear body bolster $A^{17}$ of the locomotive car body A.

The high duty steam generating boiler D, in order to adapt it for effective coöperation with the other parts of my railway steam motor car, and for use within the limited space available for it in the locomotive car body A without interfering with the seating or passenger carrying portion of the car, and for use of the ordinary coal employed by steam railways as a fuel, and at the same time enable it to have the requisite heating surface, grate area and fire box capacity, is furnished with primary and secondary flue chambers at opposite ends of the boiler, and with a wide, deep fire box at the front end over the smaller wheels of the locomotive truck. The boiler D comprises a main boiler shell $D^1$, which forms the exterior of the boiler, two steam domes $D^2$ $D^3$, a primary flue chamber $D^4$, a secondary flue chamber $D^5$, primary flues $D^6$, secondary flues $D^7$ and fire box $D^{10}$. The steam domes $D^2$ $D^3$ have a conduit or connection $D^9$ extending between them.

The fire box $D^{10}$ is located within the boiler shell and furnished with a fire door $D^{12}$ located conveniently to the engineer's floor or operating section $A^1$ of the locomotive car body. The primary flues $D^6$ lead from the fire box $D^{10}$ to the primary flue chamber $D^4$. The secondary flues $D^7$ lead from the primary flue chamber $D^4$ to the seconday flue chamber $D^5$. The primary flue chamber $D^4$ is covered at its outer end by a primary flue chamber cover $D^{11}$, and this chamber is arranged with a spark hole S for the purpose of discharging any sparks or dirt that may accumulate in the primary flue chamber. The primary flue chamber is also provided with a poke hole $D^{14}$ for the purpose of furnishing a place to insert a poker to break up any sparks in the chamber. The spark hole and poke holes each have a removable cover $D^{14}$ which forms a complete closure therefor. The secondary flue chamber $D^5$ connects with a smoke stack breeching $D^{15}$ to which the smoke stack $D^{16}$ is connected.

The fire chamber $D^3$ is made large, wide and deep and projects materially below the main or flue portion of the boiler, and is furnished with a grate $D^{17}$ suitable for burning bituminous, anthracite or other coal such as is commonly used on steam railways. The action of draft for burning fuel on the grate $D^{17}$ in the fire box $D^3$ is from the fire box through the primary flues $D^6$ to the primary flue chamber $D^4$, thence, through the secondary flues $D^7$ to the secondary flue chamber $D^5$ and through the breeching $D^{15}$ to the smoke stack $D^{16}$. The secondary flue chamber $D^5$ is stayed to the fire box below by stays $D^{18}$ and to the front dome of the boiler shell by stays $D^{19}$. The smoke stack breeching $D^{15}$ covers the front end of the secondary flue chamber $D^5$.

The cover $D^{11}$ for the rear end of the primary flue chamber $D^4$ is of a hollow or double wall construction, furnished with stays $D^{20}$, and serves as the main feed water heater, the feed water passing through this hollow flue chamber cover $D^{11}$ before entering the boiler. The feed water for the boiler enters the water heating flue chamber cover through a conduit or pipe $D^{21}$ and passes to the boiler through the conduit or pipe $D^{22}$.

The water heater flue cover $D^{11}$ not only serves to increase the heating or steaming capacity of the boiler, but also serves to protect the carrying portion of the locomotive car body from the intense heat of the boiler fire box, and as a further means in addition to the interposed baggage compartment A for insulating the seating section of the locomotive car body from the boiler.

The boiler shell supports $D^{23}$ are preferably located on the boiler shell $D^1$ adjacent to the corners of the fire box, and also under the cylindrical portion of the boiler shell near the primary flue chamber, and these boiler shell supports are securely and permanently fastened or riveted to the boiler shell; and the same are removable and firmly secured to the locomotive car body A by bolts or removable fasteners $D^{25}$ so that the boiler D may, when desired, for overhauling or repairs, be bodily removed from the locomotive car body A by simply removing the connecting bolts $D^{25}$. The locomotive car body A at the boiler section $A^1$ thereof is provided with a boiler supporting saddle member or rest R, preferably consisting of a steel plate placed edgewise and cut out at its upper portion to the contour of the boiler. It is preferably reinforced with curved angle irons $R^1$ at its upper part which gives an extended bearing contact with the boiler. It is rigidly secured by rivets at its ends to the Z bar uprights or studs $a^7$ of the locomotive car body frame and at its lower edge by angle irons $r^1$ riveted to it and to the floor plate $a^1$. It is furnished at its upper edge with a stiffening bead $r$. The boiler D is further provided with a secondary feed water heater $D^{26}$, an air storage drum or tank $D^{27}$, a duplex or other water pump $D^{28}$ and an injector $D^{29}$ and an air pump $D^{30}$, these parts being all of any suitable or well known construction customarily employed upon steam locomotives and needing no description.

The locomotive car body A at one side of the boiler D is furnished with a coal bunker or compartment $A^{13}$, having a forwardly inclined bottom $A^{14}$. The car body A is further provided at the locomotive section $A^1$ thereof with side look-out openings or windows $a^{24}$ and with front windows $a^{25}$ and with a front door $a^{26}$ and with a sheet metal partition or wind shield $a^{27}$ which projects rearward toward the fire box end of the boiler from the hinge side of the door. This partition $a^{27}$ affords a wall space or support for the engine appliances, such as brake valves, steam gages, etc. As my invention, the locomotive car body has its front door $A^{10}$ at the middle of the front end of the car and leading out onto the engineer's narrow platform $A^{41}$, this enables me to utilize for coal bunker the entire room or space at one side of the boiler to the front end of the locomotive car body, while at the same time the space at the other side of this central front door is utilized for the reverse or controlling lever and other engine operating appliances and for the accommodation of the engineer. The cross partition $A^{20}$ at the rear end of the raised boiler section $A^1$ of the locomotive car body A is furnished with a removable section $A^{21}$ to give access to the rear end of the boiler for flue cleaning or other purposes.

The feed water tank E for the boiler is a rectangular metal box of boiler plate construction, supported under the car body at the seating or passenger section $A^2$ thereof. It is provided on either side with a hollow sliding or shelf-like feed member $E^1$ fitting in suitable guides $E^2$ on the tank E so that it may be drawn out as illustrated in Fig. 17 for connection with the hose or water pipe in filling the tank, and then again shut or closed within the outer edge of the tank so as to be out of the way. To limit the outward movement of this feed tube or shelf $E^1$, it is furnished with a stop and supporting rod $E^{22}$. Its upper wall has an opening $E^3$ for insertion of the water feed pipe or hose. The water supply tank E is furnished with a well drain cup $E^4$ having a strainer $E^5$ and opening $E^6$ closed by a removable drain plug $E^7$. The water supply pipe $E^8$ leading from the water tank E to the feed water pump of the boiler is preferably connected at $E^9$ with the well or drain cup $E^4$.

The locomotive engine F comprises a pair of large high power steam cylinders $F^1$ and pistons $F^2$, steam chest $F^3$, valve mechanism $F^4$, cross head $f$, guides $f^1$, pitman or connecting rod $f^2$, crank pin $f^3$, box $f^4$, counterbalance $f^5$, link motion mechanism $f^6$ and reverse lever mechanism $f^8$ extending from the valve mechanism $F^4$ to the rocker lever $f^9$ on the locomotive car body through the reach rod $f^{10}$ to the reverse lever $f^{11}$ at the engineer's floor or section $A^{44}$ of the locomotive car body. The reverse lever connecting mechanism $f^8$ on the locomotive engine is furnished with a universal, double or two-way toggle joint connection $f^{12}$ having pivots $f^{13}$ $f^{14}$ at right angles to each other between the lever $f^9$ on the car body and the lever $f^{15}$ on the locomotive truck in order to compensate for any slight movements of the locomotive truck frame in respect to the locomotive car body incident to passing round curves or to the jarring or up and down movements of the locomotive truck and car body. This toggle or double jointed connection, while allowing for the necessary movement between the body A and locomotive truck frame, at the same time provides for a positive movement of the valve mechanism by the reverse lever on the body A.

The live steam and exhaust pipes $G^1$ $G^2$ extending from the boiler on the locomotive car body to the engine on the locomotive truck are furnished each with three ball and socket connections or flexible joints G, each preferably comprising a socket member $g$, ball member $g^1$, and a socket clamp member $g^2$ furnished with screw threads $g^3$ engaging screw threads $g^4$ on the socket member $g$ so that the locomotive car body and the locomotive truck may have free movement in all directions in respect to each other without causing any strain upon the steam conduits or pipes leading from one to the other or otherwise interfering with the absolutely essential and necessary steam tightness of the joints under the heavy steam pressure necessary for effective operation. In order to reduce as far as possible the amount of movement at the ball and socket connections between the different sections of the steam conduits or pipes on the locomotive car body and on the locomotive truck, the steam pipes from each of the cylinders of the engine are brought up centrally in a manifold joint member or casting $G^3$ through the truck and locomotive car body center plates. This casting or manifold joint member $G^3$ is furnished with a rectangular collar $g^4$ and is securely anchored to the lower or truck center plate by means of segmental clamp plates $G^5$ which are secured by bolts $g^{15}$ to the truck center plate, and which have a rectangular socket which closely fits and embraces the rectangular collar $G^4$ on the manifold joint member or casting $G^3$. The socket members $g$ of the ball and socket joints G are formed in the several branches of this manifold joint member or casting $G^3$, and thus bring the several ball and socket joints G quite near the center of the center plates, thereby very materially reducing the amount of motion required to be provided for by the ball and socket joints or flexible connections G.

As the manifold joint member or casting G extends up through the center plates and is thus located near the center of the truck, this gives a long or extended pipe connection therefrom to the steam chest of the engine so that the long length of pipe will itself, by its own flexibility or elasticity, materially reduce the movement and wearing action between the ball and socket members $g^1$ $g$ of the ball and socket joints or connections G, both at the manifold joint member or casting $G^3$ and at the steam chest. At the steam chest, a joint member $G^4$ is employed, having a screw threaded adjustment member $g^5$ and ball joint member $g^6$. The adjustment member $g^5$ may be ground down to any thickness required, and thus facilitate the assembling of the steam pipes and other parts after the same are made of the approximate length necessary to secure snug and tight joints. The ball joint member $g^6$ takes up any irregularities of line in the steam pipe sections leading to the steam chest. Similar joints are also employed between the throttle valve box $D^{40}$ and the anchor casting $G^5$ by which the steam pipes are secured to the boiler shell. The steam pipes $G^1$ $G^2$ are secured to the boiler D by an anchor casting $G^5$ so as to relieve the ball and socket connections G from any strain due to the weight of the steam pipes or conduits. Three ball and socket joint members are employed between the anchor casting $G^5$ and the manifold joint casting $G^3$ which extends up through the center plates so as to give full flexibility in every direction to the live steam pipe or conduit and prevent any strain thereon tending to loosen or impair the tightness of the joints.

At the boiler portion $A^1$ of the body A, the inner channels $a$ of the side sills $A^3$ are preferably replaced by angles $a$ $a$, as the upright wall plates $a^5$ (see Fig. 27) are not materially cut away by the small windows of the boiler section, so that the frame at the boiler section receives great reinforcement from the upright steel wall plates $a^5$. The angle bar $a$ $a$ having no lower flange, materially economizes space for the engine cylinders and boiler fire box.

In my railway steam motor car, as the ash pit or pan $D^{31}$ of the boiler D projects below the fire box $D^1$ thereof into the open space between the side frames $b$ of the engine truck, ample room is thus provided for the ash pan and fire box and for the discharge of the ashes and cinders below. As the steam exhaust pipe or conduit $G^2$ from the engine is of comparatively great extent in length and also furnished with several bends in direction, leading as it does from the engine cylinders to the center plate and then from the center plate to the smoke stack for draft purposes, this gives the discharge of the exhaust into the smoke stack a muffled or continuous action and materially economizes the consumption of fuel, and also practically eliminates noise from the exhaust and consequent annoyance.

In my invention the locomotive car body is supported, as before explained, at one end by an ordinary passenger coach trailer truck, and is thus efficiently cushioned at this end against disagreeable jars or vibrations from the truck wheels by the customary trailer truck spring-mechanism and equalizers interposed between the journal boxes and the trailer truck center plate. In order that my locomotive car body may also be efficiently cushioned at its other end against disagreeable shocks or jars imparted to it from the wheels of the locomotive truck, while at the same time the front end of the locomotive truck may be of the necessary low construction to accommodate the large deep fire box of the boiler on the locomotive car body, which conditions require that the journal boxes of the pilot or small front wheels of the locomotive truck should be without any spring mechanism directly over or near thereto, I construct my locomotive truck as before described, with equalizer bars ($b^{17}$) connected directly to the front journal boxes at the rear side thereof, and locate the truck bolster and center plate materially nearer the driving wheels than the pilot or small front wheels of the truck, and provide the journal boxes of the drivers with ample cushioning devices or springs interposed between the same and the rear ends of the equalizer bars, and also interpose springs between the low or depressed equalizer bars and the truck frame, in front of the truck bolster and center plate, and between the same and the front journal boxes.

By this construction and coöperative combination of parts, although my locomotive truck at its low front end is of a comparatively rigid non-cushioned construction as required for coöperative action with the deep fire box boiler, the locomotive car body supported upon the locomotive truck, is nevertheless, adequately cushioned against disagreeable shocks, jars or vibrations from both the front wheels or driving wheels thereof, because the truck bolster and center plate are located comparatively near the amply cushioned drivers and because the springs acting upon the low equalizing bars, between the truck bolster and the front journal boxes, effectually prevent the front wheels of the locomotive truck from imparting to the locomotive car body any material shocks, jars or vibrations. In other words, my locomotive truck may in a sense be termed as being of an ordinary locomotive engine frame construction at its rear end, and at its front end of a rigid or locomotive truck construction.

I claim:

1. A railway steam motor car, comprising in coöperative combination a trailer truck, a locomotive truck having small front wheels, large driving wheels and a low frame, a locomotive-car-body without center and intermediate sills, having strong, deep side sills and a depressed-floor-seating portion and a raised-floor boiler portion, a high-duty steam generating boiler in the raised-floor boiler portion of said body, having primary and secondary flue chambers and primary and secondary flues, and provided with a wide, deep fire-box, a high-capacity engine mounted on said locomotive truck outside its side-frames and wheels, steam pipes extending between said boiler and engine and each furnished with a plurality of flexible ball and socket joints, substantially as specified.

2. A railway steam motor car, comprising in coöperative combination a trailer truck, a locomotive truck having small front wheels, large driving wheels and a low frame, a locomotive-ear-body without center and intermediate sills, having strong, deep side sills and a depressed-floor seating portion and a raised-floor boiler portion, a high duty steam generating boiler in the raised-floor boiler portion of said body, having primary and secondary flue chambers and primary and secondary flues, and provided with a wide, deep fire-box, a high-capacity engine mounted on said locomotive truck outside its side-frames and wheels, steam pipes extending between said boiler and engine and each furnished with a plurality of flexible ball and socket joints, said boiler being removably secured in said locomotive-car-body, substantially as specified.

3. A railway steam motor car, comprising in coöperative combination a trailer truck, a locomotive truck having small front wheels, large driving wheels and a low frame, a locomotive-car-body without center and intermediate sills, having strong, deep side sills and a depressed-floor seating portion and a raised-floor boiler portion, a high-duty steam generating boiler in the raised-floor boiler portion of said body, having primary and secondary flue chambers and primary and secondary flues, and provided with a wide, deep fire-box, a high-capacity engine mounted on said locomotive truck outside its side frames and wheels, steam pipes extending between said boiler and engine and each furnished with a plurality of flexible ball and socket joints, said boiler being removably secured in said locomotive-car-body, and said locomotive-car-body having a removable roof section over its raised floor boiler portion thereof, substantially as specified.

4. A railway steam motor car, comprising in coöperative combination a trailer truck, a locomotive truck having small front wheels, large driving wheels and a low frame, a locomotive car-body without center and intermediate sills, having strong, deep side sills and a depressed floor seating portion and a raised floor boiler portion, a high-duty steam generating boiler in said raised floor boiler portion of said body, having primary and secondary flue chambers and primary and secondary flues, and provided with a wide, deep fire-box, a high-capacity engine mounted on said locomotive truck outside its side frames and wheels, steam pipes extending between said boiler and engine and each furnished with a plurality of flexible ball and socket joints, said locomotive-car-body having a baggage compartment at the front end of its depressed floor seating portion, substantially as specified.

5. A railway steam motor car, comprising in coöperative combination a trailer truck, a locomotive truck having small front wheels, large driving wheels and a low frame, a locomotive car-body without center and intermediate sills, having strong, deep side sills and a depressed floor seating portion and a raised floor boiler portion, a high-duty steam generating boiler in the raised floor boiler portion of said body, having primary and secondary flue chambers and primary and secondary flues, and provided with a wide, deep fire-box, a high-capacity engine mounted on said locomotive truck outside its side frames and wheels, steam pipes extending between said boiler and engine and each furnished with a plurality of flexible ball and socket joints, said locomotive-car-body having a coal bunker at one side of said boiler, substantially as specified.

6. A railway steam motor car, comprising in coöperative combination a trailer truck, a locomotive truck having small front wheels, large driving wheels and a low frame, a locomotive-car-body without center and intermediate sills, having strong, deep side sills and a depressed floor seating portion and a raised floor boiler portion, a high-duty steam generating boiler in the raised floor boiler portion of said body, having primary and secondary flue chambers and primary and secondary flues, and provided with a wide, deep fire-box, a high-capacity engine mounted on said locomotive truck outside its side frames and wheels, steam pipes extending between said boiler and engine and each furnished with a plurality of ball and socket joints, said steam pipes having a manifold joint member secured centrally to the truck center plate, substantially as specified.

7. A railway steam motor car, comprising in coöperative combination a trailer truck, a locomotive truck having small front wheels, large driving wheels and a low frame, a locomotive-car-body without center and intermediate sills, having strong, deep side sills and a depressed floor seating portion and a raised floor boiler portion, a high-duty steam generating boiler in the raised floor boiler portion of said body, having primary and secondary flue chambers and primary and secondary flues, and provided with a wide, deep fire-box, a high-capacity engine mounted on said locomotive truck outside its side frames and wheels, steam pipes extending between said boiler and engine and each furnished with a plurality of flexible ball and socket joints, said wide, deep fire-box of the boiler being over the small wheels of said locomotive truck, substantially as specified.

8. A railway steam motor car, comprising in coöperative combination a trailer truck, a locomotive truck having small front wheels, large driving wheels and a low frame, a locomotive-car-body without center and intermediate sills, having strong, deep side sills and a depressed floor seating portion and a raised floor boiler portion, a high-duty steam generating boiler in the raised floor boiler portion of said body, having primary and secondary flue chambers and primary and secondary flues, and provided with a wide, deep fire-box, a high-capacity engine mounted on said locomotive truck outside its side frames and wheels, steam pipes extending between said boiler and engine and each furnished with a plurality of flexible ball and socket joints, and an engine-operating lever at the front end of said locomotive-car-body, substantially as specified.

9. A railway steam motor car, comprising in coöperative combination a trailer truck, a locomotive truck having small front wheels, large driving wheels and a low frame, a locomotive-car-body without center or intermediate sills, having strong, deep side sills and a depressed floor seating portion and a raised floor boiler portion, a high duty steam generating boiler in the raised floor boiler portion of said body, having primary and secondary flue chambers and primary and secondary flues, and provided with a wide, deep fire-box, a high capacity engine mounted on said locomotive truck outside its side frames and wheels, steam pipes extending between said boiler and engine and each furnished with a plurality of flexible ball and socket joints, engine - operating lever at the front end of said locomotive-car-body, valve mechanism on said engine and connecting mechanism between said valve mechanism and said engine-operating lever furnished with a toggle joint connection, substantially as specified.

10. In a railway steam motor car, the combination with a locomotive truck and engine mounted thereon, of a locomotive-car-body and boiler mounted thereon, said truck and body having center plates, and steam conduits extending between said boiler and engine and furnished with ball and socket joints adjacent to the center plate connection of body and truck, said steam conduits having a manifold joint member extending up through the center plates, substantially as specified.

11. In a railway steam motor car, the combination with a locomotive truck and engine mounted thereon, of a locomotive-car-body and boiler mounted thereon, said truck and body having center plates, and steam conduits extending between said boiler and engine and furnished with ball and socket joints adjacent to the center plate connection of body and truck, said steam conduits having a manifold joint member extending up through the center plates, and said truck center plate having clamp plates for anchoring said manifold joint member thereto, substantially as specified.

12. In a railway steam motor car, the combination with a locomotive truck and engine, of a locomotive-car-body having a swivel connection with said truck, a high-duty boiler mounted on said body, steam conduits extending between said boiler and engine each furnished with three ball and socket joints, said ball and socket joints being all arranged near the vertical axis of the center plate connection of said body and truck, substantially as specified.

13. In a railway steam motor car, the combination with a locomotive truck and engine, of a locomotive-car-body comprising a seating portion, furnished with passenger seats, and a boiler portion at one end and having a center plate connection with said truck, a high-duty boiler mounted on said body, and steam conduits extending through the center plates between said boiler and engine and provided with flexible joints, substantially as specified.

14. In a railway steam motor car, the combination with a locomotive truck and engine, of a locomotive-car-body having a swivel connection with said truck, a high-duty boiler mounted on said body, and steam conduits extending between said boiler and engine and provided with flexible joints, said boiler being removably secured in said locomotive-car-body, substantially as specified.

15. In a railway steam motor car, the combination with a locomotive truck and engine, of a locomotive-car-body having a swivel connection with said truck, a high-duty boiler mounted on said body, and steam conduits extending between said boiler and engine and provided with flexible joints, said boiler being removably secured in said locomotive-car-body, and said locomotive-car-body having a removable roof section, substantially as specified.

16. In a railway steam motor car, the combination with a locomotive truck and engine, of a locomotive-car-body having a swivel connection with said truck, a high-duty boiler mounted on said body, and steam conduits extending between said boiler and engine and provided with flexible joints arranged near the vertical axis of said swivel connection with the truck, said locomotive-car-body having a depressed floor seating portion and a raised floor boiler portion, substantially as specified.

17. In a railway steam motor car, the combination with a locomotive truck and engine, of a locomotive-car-body having a swivel connection with said truck, a high-duty boiler mounted on said body, and steam conduits extending between said boiler and engine and provided with flexible joints arranged near the vertical axis of said swivel connection with the truck, said locomotive-car-body being without center and intermediate longitudinal sills and having deep, strong continuous side sills, substantially as specified.

18. In a railway steam motor car, the combination with a locomotive truck and engine, of a locomotive-car-body having a swivel connection with said truck, a high-duty boiler mounted on said body, and steam conduits extending between said boiler and engine and provided with flexible joints, said locomotive-car-body being without center and intermediate longitudinal sills and having deep, strong continuous side sills, and being provided with cross beams above the side sills at the boiler portion thereof, and with cross beams below the side sills at the seating or passenger carrying portion of said body, substantially as specified.

19. In a railway steam motor car, the combination with a locomotive truck and engine, of a locomotive-car-body having a swivel connection with said truck, a high-duty boiler mounted on said body, and steam conduits extending between said boiler and engine and provided with flexible joints, said locomotive truck having large driving wheels and small front wheels, and said boiler having a wide, deep fire box over the front wheels of said locomotive truck, substantially as specified.

20. The combination with a locomotive truck and engine, of a locomotive-car-body having a center plate connection therewith, and provided with a raised floor boiler portion and a depressed floor seating portion, and steam conduits extending between said boiler on the locomotive car body and said engine on the locomotive truck and provided with a plurality of ball and socket connections arranged near the vertical axis of said center plate connection between said locomotive car body and truck substantially as specified.

21. The combination with a locomotive truck and engine, of a locomotive-car-body having a center plate connection therewith, and provided with a raised floor boiler portion and a depressed floor seating portion, and a high-duty, wide, deep fire-box boiler mounted on the raised floor portion of said body, and steam conduits extending between said boiler on the locomotive car body and said engine on the locomotive truck and provided with a plurality of ball and socket connections arranged near the vertical axis of said center plate connection between said locomotive car body and truck substantially as specified.

22. The combination with a locomotive truck and engine, of a locomotive-car-body having a center plate connection therewith, and provided with a raised floor boiler portion and a depressed floor seating portion, said body having side sills but being free from center or intermediate sills, and steam conduits extending between said boiler on the locomotive car body and said engine on the locomotive truck and provided with a plurality of ball and socket connections arranged near the vertical axis of said center plate connection between said locomotive car body and truck substantially as specified.

23. The combination with a locomotive truck and engine, of a locomotive-car-body having a center plate connection therewith, and provided with a raised floor boiler portion and a depressed floor seating portion, said body having side sills but being free from center or immediate sills, and said body being provided with cross beams above said side sills at the raised floor portion thereof, substantially as specified.

24. The combination with a locomotive truck and engine, of a locomotive-car-body having a center plate connection therewith, and provided with a raised floor boiler portion and a depressed floor seating portion, said body having side sills but being free from center and intermediate sills, and said body being provided with cross beams above said side sills at the raised floor portion thereof, and with cross beams below said side sills at the depressed floor portion thereof, substantially as specified.

25. The combination with a locomotive truck and engine, of a locomotive-car-body having a center plate connection therewith, and provided with a raised floor body portion and a depressed floor seating portion, and a high-duty boiler having a wide, deep fire box at its free end, said locomotive truck having at its front end under the fire box portion of said boiler wheels which are smaller than its drivers, substantially as specified.

26. The combination with a locomotive truck and engine, of a locomotive-car-body having a center plate connection therewith, and provided with a raised floor body portion and a depressed floor seating portion, and a high-duty boiler having a wide, deep fire box at its front end, said locomotive truck having at its front end under the fire box portion of said boiler wheels which are smaller than its drivers, and steam conduits extending between said boiler and engine and provided with a plurality of ball and socket connections, substantially as specified.

27. The combination with a locomotive truck and engine, of a locomotive-car-body having a center plate connection therewith, and provided with a raised floor boiler portion and a depressed floor seating portion, said locomotive-car-body having a baggage and heat insulating compartment at the rear of said raised floor boiler section, and steam conduits extending between said boiler on the locomotive car body and said engine on the locomotive truck and provided with a plurality of ball and socket connections arranged near the vertical axis of said center plate connection between said locomotive car body and truck, substantially as specified.

28. The combination with a locomotive truck and engine, of a locomotive-car-body having a center plate connection therewith, and provided with a raised floor boiler portion and a depressed floor seating portion, and said locomotive-car-body having at its rear end a vestibule section furnished with a transversely extending seat, and steam conduits extending between said boiler on the locomotive car body and said engine on the locomotive truck and provided with a plurality of ball and socket connections arranged near the vertical axis of said center plate connection between said locomotive car body and truck substantially as specified.

29. The combination with a locomotive truck and engine, of a locomotive-car-body having a center plate connection therewith, and provided with a raised floor boiler portion and a depressed floor seating portion, said locomotive-car-body having side sills and having its depressed floor at the lower edge of said side sills and being provided with seats supported at one end on the upper edges of said side sills, substantially as specified.

30. The combination with a locomotive truck and engine, of a locomotive-car-body having a center plate connection therewith, and provided with a raised floor boiler portion and a depressed floor seating portion, said locomotive-car-body having its floor, upright walls and roof composed of steel plates, and steam conduits extending between said boiler on the locomotive car body and said engine on the locomotive truck and provided with a plurality of ball and socket connections arranged near the vertical axis of said center plate connection between said locomotive car body and truck substantially as specified 31. The combination with a locomotive truck and engine, of a locomotive-car-body having a center plate connection therewith, and provided with a raised floor boiler portion and a depressed floor seating portion, said locomotive-car-body having its upright walls and roof composed of steel plates and provided with an inner lining wall, and steam conduits extending between said boiler on the locomotive car body and said engine on the locomotive truck and provided with a plurality of ball and socket connections arranged near the vertical axis of said center plate connection between said locomotive car body and truck substantially as specified.

32. The combination with a locomotive truck and engine, of a locomotive-car-body having a center plate connection therewith, and provided with a raised floor boiler portion and a depressed floor seating portion, said locomotive-car-body having a removable roof section above its raised floor boiler portion, substantially as specified.

33. The combination with a locomotive truck and engine, of a locomotive-car-body having a center plate connection therewith, and provided with a raised floor boiler portion and a depressed floor seating portion, said locomotive-car-body having a superstructure frame composed of Z-bar studs or uprights and horizontal side and end angle plates, and T-bar roof members or rafters, substantially as specified.

34. The combination with a locomotive truck and engine, of a locomotive-car-body having a center plate connection therewith, and provided with a raised floor boiler portion and a depressed floor seating portion, said locomotive-car-body having a superstructure frame composed of Z-bar studs or uprights and horizontal side and end angle plates, and T-bar roof members or rafters, and its walls composed of outer steel plates and an inner wall, substantially as specified.

35. In a railway steam motor car, the combination with a locomotive truck and engine, of a locomotive-car-body having a swivel connection with said truck, a high-duty boiler mounted on said body, and steam conduits extending between said boiler and engine and provided with flexible joints, said boiler having primary and secondary flue chambers, primary and secondary flues, a wide, deep fire box and a primary water heater cover for said primary flue chamber, substantially as specified.

36. The combination with a locomotive truck and engine, of a locomotive-car-body having a center plate connection therewith, and provided with a raised floor boiler portion and a depressed floor seating portion, a high-duty, wide, deep fire box boiler mounted on the raised floor portion of said body, said locomotive truck having small wheels under and large driver wheels at the rear of the fire box portion of said boiler, substantially as specified.

37. The combination with a locomotive truck and engine, of a locomotive-car-body having a center plate connection therewith, and provided with a raised floor boiler portion and a depressed floor seating portion, a high-duty, wide, deep fire box boiler mounted on the raised floor portion of said body, said locomotive truck having small wheels under and large drive wheels at the rear of the fire box portion of said boiler, said boiler having a primary flue chamber, a secondary flue chamber, primary flues and secondary flues, substantially as specified.

38. The combination with a locomotive truck and engine, of a locomotive-car-body having a center plate connection therewith, and provided with a raised floor boiler portion and a depressed floor seating portion, a high-duty, wide, deep fire box boiler mounted on the raised floor portion of said body, said locomotive truck having small wheels under and large drive wheels at the rear of the fire box portion of said boiler, a primary flue chamber, a secondary flue chamber, primary flues and secondary flues, said engine being mounted on said locomotive truck outside the wheels and side frames thereof, substantially as specified.

39. The combination with a locomotive truck and engine, of a locomotive-car-body having a center plate connection therewith, and provided with a raised floor boiler portion and a depressed floor seating portion, a high-duty, wide, deep fire box boiler mounted on the raised floor portion of said body, said locomotive truck having small wheels under and large drive wheels at the rear of the fire box portion of said boiler, a primary flue chamber, a secondary flue chamber, primary flues and secondary flues, said boiler being removably mounted on said locomotive-car-body, substantially as specified.

40. The combination with a locomotive truck and engine, of a locomotive-car-body having a center plate connection therewith, and provided with a raised floor boiler portion and a depressed floor seating portion, a high-duty, wide, deep fire box boiler mounted on the raised floor portion of said body, said locomotive truck having small wheels under and large drive wheels at the rear of the fire box portion of said boiler, a primary flue chamber, a secondary flue chamber, primary flues and secondary flues, said boiler being removably mounted on said locomotive-car-body, and said locomotive-car-body having a removable roof section, substantially as specified.

41. In a steam motor car, the combination with a locomotive-car-body, of a locomotive truck, a boiler on said body having a wide, deep fire box with its ash pit projecting below the main portion of the boiler between the locomotive truck wheels, and an engine on said truck outside the wheels and side frames thereof, said locomotive truck having large drivers and smaller wheels in front under the fire box portion of said boiler, and steam conduits extending between said boiler on the locomotive car body and said engine on the locomotive truck and provided with a plurality of ball and socket connections arranged near the vertical axis of said center plate connection between said locomotive car body and truck substantially as specified.

42. In a steam motor car, the combination with a locomotive-car-body, of a locomotive truck, a boiler on said body having a wide, deep fire box with its ash pit projecting below the main portion of the boiler between the locomotive truck wheels, and an engine on said truck outside the wheels and side frames thereof, said locomotive truck having large drivers and smaller wheels in front under the fire box portion of said boiler, and steam conduits extending from said boiler to said engine, and provided each with a plurality of ball and socket joints, substantially as specified.

43. In a steam motor car, the combination with a locomotive-car-body, of a locomotive truck, a boiler on said body having a wide, deep fire box with its ash pit projecting below the main portion of the boiler between the locomotive truck wheels, and an engine on said truck outside the wheels and side frames thereof, said locomotive truck having large drivers and smaller wheels in front under the fire box portion of said boiler, and steam conduits extending from said boiler to said engine and provided each with a plurality of ball and socket joints, said ball and socket joints being adjacent to said center plate connection between said body and truck, substantially as specified.

44. In a steam motor car, the combination with a locomotive-car-body, of a locomotive truck, a boiler on said body having a wide, deep fire box with its ash pit projecting below the main portion of the boiler between the locomotive truck wheels, and an engine on said truck outside the wheels and side frames thereof, said locomotive truck having large drivers and smaller wheels in front under the fire box portion of said boiler, and steam conduits extending from said boiler to said engine and provided each with a plurality of ball and socket joints, said ball and socket joints being adjacent to said center plate connection between said body and truck, and said boiler being removably connected to said locomotive-car-body, substantially as specified.

45. In a steam motor car, the combination with a locomotive-car-body, of a locomotive truck, a boiler on said body having a wide, deep fire box with its ash pit projecting below the main portion of the boiler between the locomotive truck wheels, and an engine on said truck outside the wheels and side frames thereof, said locomotive truck having large drivers and smaller wheels in front under the fire box portion of said boiler, and steam conduits extending from said boiler to said engine and provided each with a plurality of ball and socket joints, said ball and socket joints being adjacent to said center plate connection between said body and truck, and said boiler being removably connected to said locomotive-car-body, and said locomotive-car body having a removable roof section over the boiler containing portion thereof, substantially as specified.

46. In a steam motor car, the combination with a locomotive-car-body, of a locomotive truck, a boiler on said body having a wide, deep fire box with its ash pit projecting below the main portion of the boiler between the locomotive truck wheels, and an engine on said truck outside the wheels and side frames thereof, said boiler having a primary flue chamber and a secondary flue chamber, and primary flues and secondary flues, and a water heater primary-flue-chamber cover, substantially as specified.

47. The combination with a locomotive truck and engine, of a locomotive-car-body having a center plate connection therewith, and provided with a raised floor boiler portion and a depressed floor seating portion, a high-duty, wide, deep fire box boiler mounted on the raised floor portion of said body, said locomotive truck having small wheels under and large drive wheels at the rear of the fire box portion of said boiler, a primary flue chamber, a secondary flue chamber, primary flues and secondary flues, said boiler being removably mounted on said locomotive car body, said locomotive car body having a removable roof section, and said locomotive-car-body having a fuel bunker at one side of said boiler, substantially as specified.

48. The combination with a locomotive truck and engine, of a locomotive-car-body having a center plate connection therewith, and provided with a raised floor boiler portion and a depressed floor seating portion, a high-duty, wide, deep, fire box boiler mounted on the raised floor portion of said body, said locomotive truck having small wheels under and large drive wheels at the rear end of the fire box portion of said boiler, a primary flue chamber, a secondary flue chamber, primary flues and secondary flues, said boiler being removably mounted on said locomotive-car-body and said locomotive car body having a removable roof section, said locomotive car body having an engineer's or operator's floor or section at the front end thereof, substantially as specified.

49. The combination with a locomotive truck and engine, of a locomotive-car-body having a center plate connection therewith, and provided with a raised floor boiler portion and a depressed floor seating portion, a high-duty, wide, deep, fire box boiler mounted on the raised floor portion of said body, said locomotive truck having small wheels under and large drive wheels at the rear of the fire box portion of said body, a primary flue chamber, a secondary flue chamber, primary flues and secondary flues, said boiler being removably mounted on said locomotive-car-body, said locomotive-car-body having a removable roof section, and said locomotive-car-body having a fuel bunker at one side of the boiler with forwardly inclined bottom, substantially as specified.

50. In a steam motor car, the combination with a locomotive-car-body, of a locomotive truck, a boiler on said body having a wide, deep fire box projecting below the main portion of the boiler between the locomotive truck wheels, and an engine on said truck outside the wheels and side frames thereof, said locomotive truck having large drivers and smaller wheels in front under the fire box portion of said boiler, and steam conduits extending from said boiler to said engine and provided each with a plurality of ball and socket joints, said ball and socket joints being adjacent to said center plate connection between said body and truck, said locomotive-car-body having an engineer's floor or section at the front end thereof and engine operating appliances mounted on said locomotive-car-body adjacent to said engineer's floor section, substantially as specified.

51. In a railway steam motor car, the combination with a locomotive-car-body, of a high-duty boiler in said body, having an enlarged fire box end, and a locomotive truck and engine having a center plate connection with said body and large drivers under the smaller end of said boiler and smaller wheels under the enlarged fire box end of said boiler, substantially as specified.

52. In a railway motor car, the combination with a locomotive-car-body comprising a seating portion, furnished with passenger seats, and a boiler portion at one end of a boiler on said body, and a locomotive truck having a center plate connection with said body, an engine on said truck, and a steam conduit extending between said boiler and engine and having a connecting member extending up through the center plates, substantially as specified.

53. In a railway motor car, the combination with a locomotive-car-body comprising a seating portion, furnished with passenger seats, and a boiler portion at one end of a boiler on said body, and a locomotive truck having a center plate connection with said body, an engine on said truck, and a steam conduit extending between said boiler and engine and having a connecting member extending up through the center plates, said connecting member having a plurality of branches, substantially as specified.

54. In a railway motor car, the combination with a locomotive-car-body comprising a seating portion, furnished with passenger seats, and a boiler portion at one end of a boiler on said body, and a locomotive truck having a center plate connection with said body, an engine on said truck, and a steam conduit extending between said boiler and engine and having a connecting member extending up through the center plates, said connecting member having a plurality of branches at each end thereof, substantially as specified.

55. In a railway motor car, the combination with a locomotive-car-body, of a boiler on said body, and a locomotive truck having a center plate connecting with said body, an engine on said truck and a steam conduit extending between said boiler and engine and having a connecting member extending up through the center plates, said steam conduit having a plurality of flexible joints therein adjacent to said connecting member, substantially as specified.

56. In a steam motor car, a locomotive-car-body having feed water tanks underneath furnished with a hollow sliding feed shelf, substantially as specified.

57. In a railway steam motor car, a locomotive-car-body having continuous side sills composed of channel bars placed back to back and breaking joints with each other, said sills having continuous curved end extensions forming end sills for said body, substantially as specified.

58. In a railway steam motor car, a locomotive-car-body comprising a seating portion and a boiler portion and having continuous side sills formed with curved end extensions across the ends of said body, said body having a raised floor at its boiler portion and a depressed floor at its seating portion, and a locomotive truck provided with an engine and having a center plate connection with said locomotive car body at the boiler end thereof, and steam conduits extending between said boiler on said body and said engine on said truck, and provided with a plurality of flexible joints near the vertical axis of said center plate connection between said body and truck substantially as specified.

59. In a railway steam motor car, a locomotive-car-body having continuous side sills formed with curved end extensions across the ends of said body, said body having depending steps at the side, and a floor of plate steel, and being provided with a wide heavy combined step and frame plate member extending to the rear end of the body and bridging the cutaway portion of the side sills at the steps, substantially as specified.

60. In a steam motor car, the combination with a locomotive-car-body and boiler thereon, of a locomotive truck and engine thereon, said body and truck having center plates, exhaust pipes leading from the engine to the center plates and from the center plates to the smoke stack of the boiler, to cause the exhaust by the length of the exhaust conduit and bends therein to produce a continuous draft action on the fire and economical consumption of fuel, said exhaust pipes being provided with a plurality of flexible joints arranged near the vertical axis of said center plates substantially as specified.

61. In a steam motor car, the combination with a locomotive-car-body and boiler thereon, of a locomotive truck and engine thereon, said body and truck having center plates, exhaust pipes leading from the engine to the center plate and from the center plates to the smoke stack of the boiler, to cause the exhaust by the length of the exhaust conduit and bends therein to produce a continuous draft action on the fire and economical consumption of fuel, said center plates having a steam exhaust connecting member extending upwardly through them, said exhaust pipes being provided with a plurality of flexible joints arranged near the vertical axis of said center plates substantially as specified.

THEODORE H. CURTIS.

Witnesses:
EDMUND ADCOCK,
H. M. MUNDAY.